(12) United States Patent
Knierim et al.

(10) Patent No.: US 7,971,481 B2
(45) Date of Patent: Jul. 5, 2011

(54) CIRCUIT DESIGN TO PREVENT FALSE LEVEL SENSE READINGS

(75) Inventors: David L. Knierim, Wilsonville, OR (US); Ivan Andrew McCracken, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 486 days.

(21) Appl. No.: 12/241,464

(22) Filed: Sep. 30, 2008

(65) Prior Publication Data

US 2010/0077854 A1    Apr. 1, 2010

(51) Int. Cl.
*G01F 23/24* (2006.01)
*G01F 23/26* (2006.01)

(52) U.S. Cl. .................... 73/304 R; 73/304 C
(58) Field of Classification Search ............... 73/304 R, 73/304 C
See application file for complete search history.

(56) References Cited

U.S. PATENT DOCUMENTS

| | | | |
|---|---|---|---|
| 3,714,561 A * | 1/1973 | Jaquay | 324/662 |
| 5,844,168 A | 12/1998 | Schueller et al. | |
| 6,223,603 B1 | 5/2001 | McKinnon | |
| 6,549,413 B2 | 4/2003 | Karnezos et al. | |
| 2007/0076023 A1* | 4/2007 | Knierim et al. | 347/7 |
| 2008/0203580 A1* | 8/2008 | Lee | 257/775 |

* cited by examiner

*Primary Examiner* — Hezron Williams
*Assistant Examiner* — Paul West
(74) *Attorney, Agent, or Firm* — Maginot, Moore & Beck LLP

(57) ABSTRACT

A circuit for conveying signals between one or more ink level sensors and a circuit includes a substrate having a circuit end, a sensor end, and an elongated body extending therebetween. The sensor end includes a bottom layer in which the first signal trace is routed and a top layer in which the second and third signal traces are routed. The sensor end includes a first, a second, and a third connector each extending through the top and the bottom layers that are electrically connected to a first signal trace, a second signal trace, and a third signal trace, respectively, in the substrate. The first connector, the second connector, and the third connector are configured for electrical connection to a first probe, a second probe, and a third probe, respectively, of the level sensor. A first ground trace is positioned in the sensor end that includes a first continuous guard ring in the top layer completely surrounding and spaced from the first connector, and a first segmented guard ring in the bottom layer including a plurality of segments that are each electrically connected to the first continuous guard ring and being spaced from the other segments in the first segmented guard ring. The first signal trace is routed in the bottom layer to the first connector via a space between the segments of the first segmented guard ring.

20 Claims, 17 Drawing Sheets

CIRCUIT DESIGN TO PREVENT FALSE LEVEL SENSE READINGS

TECHNICAL FIELD

This disclosure relates generally to ink jet printers, and in particular, to methods of maintaining ink jet printers.

BACKGROUND

Solid ink or phase change ink printers conventionally receive ink in a solid form, either as pellets or as ink sticks. The solid ink pellets or ink sticks are typically inserted through an insertion opening of an ink loader for the printer, and the ink sticks are pushed or slid along the feed channel by a feed mechanism and/or gravity toward a heater plate in the heater assembly. The heater plate melts the solid ink impinging on the plate into a liquid that is delivered to a melt reservoir. The melt reservoir is configured to maintain a quantity of melted ink in liquid or melted form and to communicate the melted ink to one or more printheads as needed.

In order to prevent the ink storage and supply assembly of the imaging device from exhausting the available supply of ink, the reservoirs of the ink storage and supply assembly may be provided with ink level sensors. Recently, ink level sensors have been developed that enable a continuous measurement of the level of ink in the reservoirs of the printer. These ink level sensors include a lower probe positioned near a lower portion of the reservoir, an upper probe that extends upward form the lower probe toward the top of the reservoir, and an outer probe. To detect the level of ink in an ink reservoir, an AC signal is driven to the outer probe. The ink in the reservoir conducts the AC signal to the lower probe and to the upper probe. A current flow is detected from the outer probe through the ink to the lower probe and from the outer probe through the ink to the upper probe. Assuming that the ink temperature and conductivity remains relatively consistent, a substantially constant current flow is detected via the lower probe. Varying levels of current flow are detected via the upper probe as more or less of the upper probe's surface area is covered or uncovered in ink. A continuous measurement of the height of ink in the ink reservoir may then be determined by calculating the ratio of the varying current flow in the upper probe to the constant current flow in the lower probe.

One difficulty faced in the operation of the level sensors described above is ink from the reservoir contacting the root of one or more of the probe tabs or the probe connection points and shorting out the signal path from the outer probe to one or both of the upper and lower probes, effectively bypassing the probes in the reservoir. Ink shorting out the probe signal paths can cause the level sensing system to fail in multiple ways including, for example, false high readings, false low readings, and shorts, any of which may ultimately disable the printer and require a field replacement of the melt reservoir system.

SUMMARY

In response to the difficulties posed by ink contacting and shorting out the signal paths for the level sensor probes, a circuit design has been developed that prevents or limits the ability of ink to short out the signal paths of the level sensors. In one embodiment, a circuit for conveying signals comprises a substrate having a circuit end, a sensor end, and an elongated body extending therebetween. The substrate is configured to extend between a first ink level sensor positioned in a first ink reservoir and a circuit displaced from the first ink reservoir. A first, a second, and a third conductive signal trace are positioned in the substrate extending between the circuit end and the sensor end. The circuit end is configured to electrically connect the first, the second, and the third signal traces to the circuit. The sensor end includes a top layer and a bottom layer. The first signal trace is routed at least partially in the bottom layer and the second and the third signal traces are routed at least partially in the top layer. The sensor end includes a first, a second, and a third connector each extending through the top and the bottom layers. The first connector is electrically connected to the first signal trace in the bottom layer, and the second connector and the third connector are electrically connected to the second signal trace and the third signal trace, respectively, in the top layer. The first connector, the second connector, and the third connector are configured for electrical connection to a first probe, a second probe, and a third probe, respectively, of the level sensor. A first ground trace is positioned in the sensor end. The first ground trace includes a first continuous guard ring in the top layer of the sensor end completely surrounding and spaced from the first connector in the top layer, and a first segmented guard ring in the bottom layer. The first segmented guard ring includes a plurality of segments, each segment in the plurality being electrically connected to the first continuous guard ring in the top layer and being spaced from the other segments in the first segmented guard ring. The first signal trace is routed in the bottom layer to the first connector via a space between the segments of the first segmented guard ring.

In another embodiment, an ink level sensing system comprises a first ink level sensor including a first probe, a second probe and a third probe configured for insertion into a first ink reservoir. A circuit is configured to generate a signal to be conveyed to the first probe of the first level sensor and to receive signals from the second probe and the third probe of the first level sensor. The system includes a substrate having a circuit end, a sensor end, and an elongated body extending therebetween. The substrate is configured to extend between the first ink level sensor and the circuit. A first, a second, and a third conductive signal trace are positioned in the substrate extending between the circuit end and the sensor end. The circuit end is configured to electrically connect the first, the second, and the third signal traces to the circuit. The sensor end includes a top layer and a bottom layer. The first signal trace is routed in the bottom layer, and the second and the third signal traces are routed in the top layer. The sensor end includes a first, a second, and a third connector each extending through the top and the bottom layers. The first connector is electrically connected to the first signal trace in the bottom layer, and the second connector and the third connector are electrically connected to the second signal trace and the third signal trace, respectively, in the top layer. The first connector, the second connector, and the third connector are configured for electrical connection to the first probe, the second probe, and the third probe, respectively, of the first level sensor. A first ground trace is positioned in the sensor end. The first ground trace includes a first continuous guard ring in the top layer of the sensor end completely surrounding and spaced from the first connector in the top layer, and a first segmented guard ring in the bottom layer. The first segmented guard ring includes a plurality of segments, each segment in the plurality being electrically connected to the first continuous guard ring in the top layer and being spaced from the other segments in the first segmented guard ring. The first signal trace is routed in the bottom layer to the first connector via a space between the segments of the first segmented guard ring.

In yet another embodiment, an ink reservoir system comprises a first ink reservoir configured to hold a quantity of ink and to communicate ink to at least one printhead, and a first ink level sensor including a first probe, a second probe and a third probe configured for insertion into the first ink reservoir. A circuit is configured to generate a signal to be conveyed to the first probe of the first level sensor and to receive signals from the second probe and the third probe of the first level sensor. The system includes a substrate having a circuit end, a sensor end, and an elongated body extending therebetween. The substrate is configured to extend between the first ink level sensor and the circuit. A first, a second, and a third conductive signal trace are positioned in the substrate extending between the circuit end and the sensor end. The circuit end is configured to electrically connect the first, the second, and the third signal traces to the circuit. The sensor end includes a top layer and a bottom layer. The first signal trace is routed in the bottom layer, and the second and the third signal traces are routed in the top layer. The sensor end includes a first, a second, and a third connector each extending through the top and the bottom layers. The first connector is electrically connected to the first signal trace in the bottom layer, and the second connector and the third connector are electrically connected to the second signal trace and the third signal trace, respectively, in the top layer. The first connector, the second connector, and the third connector are configured for electrical connection to the first probe, the second probe, and the third probe, respectively, of the first level sensor. A first ground trace is positioned in the sensor end. The first ground trace includes a first continuous guard ring in the top layer of the sensor end completely surrounding and spaced from the first connector in the top layer, and a first segmented guard ring in the bottom layer. The first segmented guard ring includes a plurality of segments, each segment in the plurality being electrically connected to the first continuous guard ring in the top layer and being spaced from the other segments in the first segmented guard ring. The first signal trace is routed in the bottom layer to the first connector via a space between the segments of the first segmented guard ring.

DETAILED DESCRIPTION OF THE PREFERRED EMBODIMENT

Figure 1:
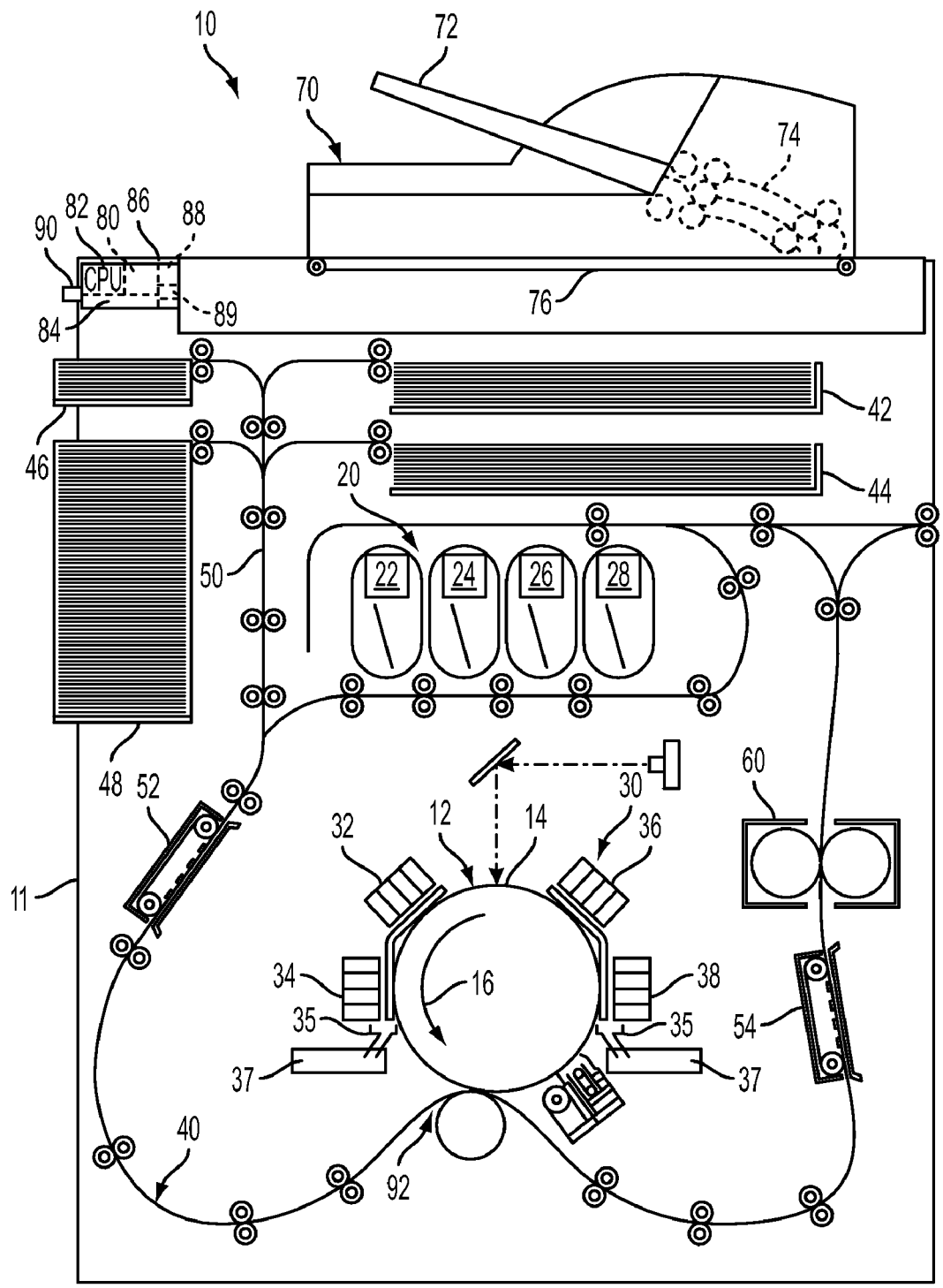
FIG. 1 is block diagram of a phase change ink image producing machine.

For a general understanding of the system disclosed herein as well as the details for the system and method, reference is made to the drawings. In the drawings, like reference numerals have been used throughout to designate like elements. As used herein, the word "printer," "imaging device," "image producing machine," etc. encompasses any apparatus that performs a print outputting function for any purpose, such as a digital copier, bookmaking machine, facsimile machine, a multi-function machine, etc.

Referring now to FIG. 1, there is illustrated an image producing machine, such as the high-speed phase change ink image producing machine or printer 10 of the present invention. As illustrated, the machine 10 includes a frame 11 to which are mounted directly or indirectly all its operating subsystems and components, as will be described below. To start, the high-speed phase change ink image producing machine or printer 10 includes an imaging member 12 that is shown in the form of a drum, but can equally be in the form of a supported endless belt. The imaging member 12 has an imaging surface 14 that is movable in the direction 16, and on which phase change ink images are formed.

The high-speed phase change ink image producing machine or printer 10 also includes a phase change ink system 20 that has at least one source 22 of one color phase change ink in solid form. Since the phase change ink image producing machine or printer 10 is a multicolor image producing machine, the ink system 20 includes for example four (4) sources 22, 24, 26, 28, representing four (4) different colors CYMK (cyan, yellow, magenta, black) of phase change inks. The phase change ink system 20 also includes a phase change ink melting and control assembly 100 (FIG. 2), for melting or phase changing the solid form of the phase change ink into a liquid form. Thereafter, the phase change ink melting and control assembly 100 then controls and supplies the molten liquid form of the ink towards a printhead system 30 including at least one printhead assembly 32. Since the phase change ink image producing machine or printer 10 is a high-speed, or high throughput, multicolor image producing machine, the printhead system includes for example four (4) separate printhead assemblies 32, 34, 36 and 38 as shown.

As further shown, the phase change ink image producing machine or printer 10 includes a substrate supply and handling system 40. The substrate supply and handling system 40 for example may include substrate supply sources 42, 44, 46, 48, of which supply source 48 for example is a high capacity paper supply or feeder for storing and supplying image receiving substrates in the form of cut sheets for example. The substrate supply and handling system 40 in any case includes a substrate handling and treatment system 50 that has a substrate pre-heater 52, substrate and image heater 54, and a fusing device 60. The phase change ink image producing machine or printer 10 as shown may also include an original document feeder 70 that has a document holding tray 72, document sheet feeding and retrieval devices 74, and a document exposure and scanning system 76.

The printer 10 may include a maintenance system for periodically performing a maintenance procedure on the printhead assembly. Maintenance procedures typically include purging ink through the print head, and wiping the faces of the printheads to remove ink and debris. The purging of ink through the printheads of the printhead assembly may be accomplished in any suitable manner as known in the art. The wiping of the printheads may be performed using at least one wiper blade (not shown) as is known in the art that is moved relative to the nozzle plates of the printheads to remove ink residue, as well as any paper, dust or other debris that has collected on the nozzle plate. As seen in FIG. 1, the maintenance assembly may include gutter assemblies 35 for collecting and guiding purged or wiped ink into one or more waste ink trays 37.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 84, and a display or user interface (UI) 86. The ESS or controller 80 for example includes sensor input and control means 88 as well as a pixel placement and control means 89. In addition the CPU 82 reads, captures, prepares and manages the image data flow between image input sources such as the scanning system 76, or an online or a work station connection 90, and the printhead assemblies 32, 34, 36, 38. As such, the ESS or controller 80 is the main multi-tasking processor for operating and controlling all of the other machine subsystems and functions, including the machine's printing operations.

In operation, image data for an image to be produced is sent to the controller 80 from either the scanning system 76 or via the online or work station connection 90 for processing and output to the printhead assemblies 32, 34, 36, 38. Additionally, the controller determines and/or accepts related subsystem and component controls, for example from operator inputs via the user interface 86, and accordingly executes such controls. As a result, appropriate color solid forms of phase change ink are melted and delivered to the printhead assemblies. Additionally, pixel placement control is exercised relative to the imaging surface 14 thus forming desired images per such image data, and receiving substrates are supplied by anyone of the sources 42, 44, 46, 48 and handled by means 50 in timed registration with image formation on the surface 14. Finally, the image is transferred within the transfer nip 92, from the surface 14 onto the receiving substrate for subsequent fusing at fusing device 60.

Figure 2:
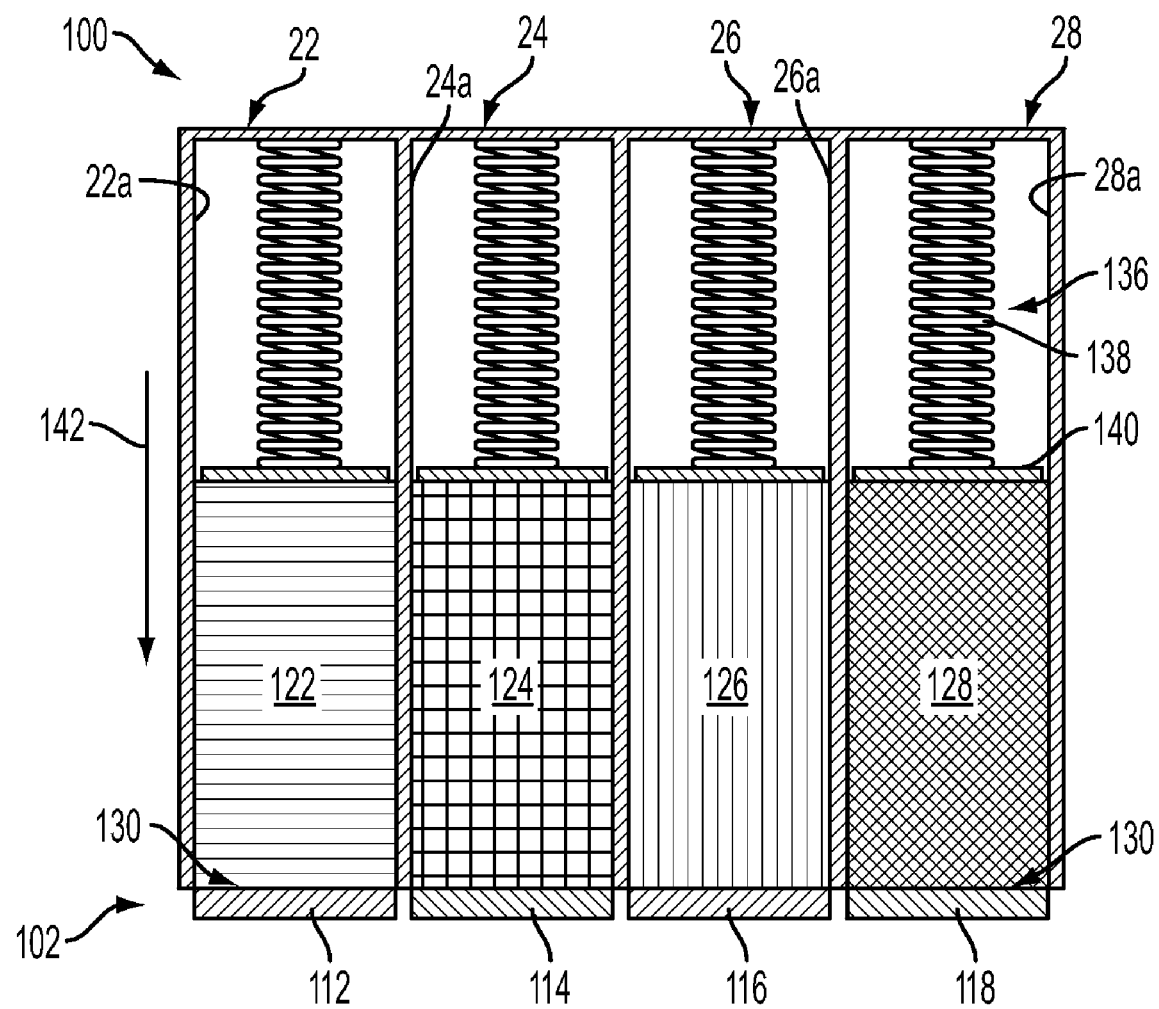
FIG. 2 is top view of four ink sources and a melter assembly having four melter plates of the phase change ink image producing machine of FIG. 1.
Figure 3:
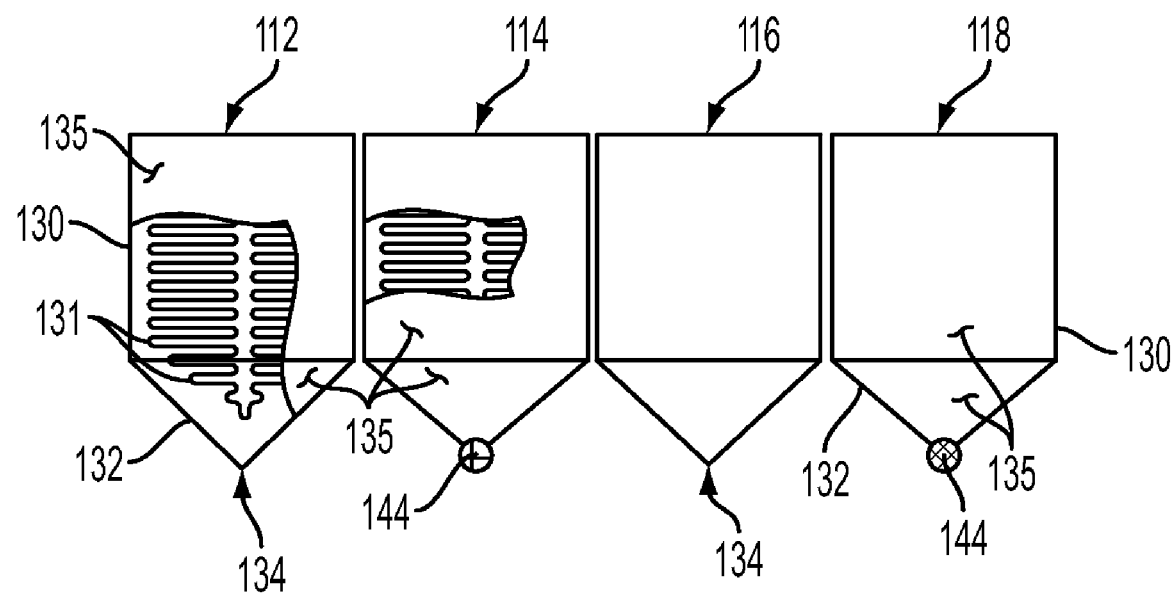
FIG. 3 is front side view of the four melter plates of the melter assembly.

Referring now to FIGS. 2 and 3, there is shown the ink delivery system 100. The ink delivery system 100 of the present example includes four ink sources 22, 24, 26, 28, each holding a different phase change ink in solid form, such as for example inks of different colors. However, the ink delivery system 100 may include any suitable number of ink sources, each capable of holding a different phase change ink in solid form. The different solid inks are referred to herein by their colors as CYMK, including cyan 122, yellow 124, magenta 126, and black 128. Each ink source can include a housing (not shown) for storing each solid ink separately from the others. The solid inks are typically in block form, though the solid phase change ink may be in other formats, including but not limited to, pellets and granules, among others.

The ink delivery system 100 includes a melter assembly, shown generally at 102. The melter assembly 102 includes a melter, such as a melter plate, connected to the ink source for melting the solid phase change ink into the liquid phase. In the example provided herein, the melter assembly 102 includes four melter plates, 112, 114, 116, 118 each corresponding to a separate ink source 22, 24, 26 and 28 respectively, and connected thereto. As shown in FIG. 3, each melter plate 112, 114, 116, 118 includes an ink contact portion 130 and a drip point portion 132 extending below the ink contact portion and terminating in a drip point 134 at the lowest end. The drip point portion 132 can be a narrowing portion terminating in the drip point.

The melter plates 112, 114, 116, 118 can be formed of a thermally conductive material, such as metal, among others, that is heated in a known manner. In one embodiment, solid phase change ink is heated to about 100° C. to 140° C. to melt the phase change ink to liquid form for supplying to the liquid ink storage and supply assembly 400. As each color ink melts, the ink adheres to its corresponding melter plate 112, 114, 116, 118, and gravity moves the liquid ink down to the drip point 134 which is disposed lower than the contact portion. The liquid phase change ink then drips from the drip point 134 in drops shown at 144. The melted ink from the melters may be directed gravitationally or by other means to the ink storage and supply assembly 400.

Figure 4:
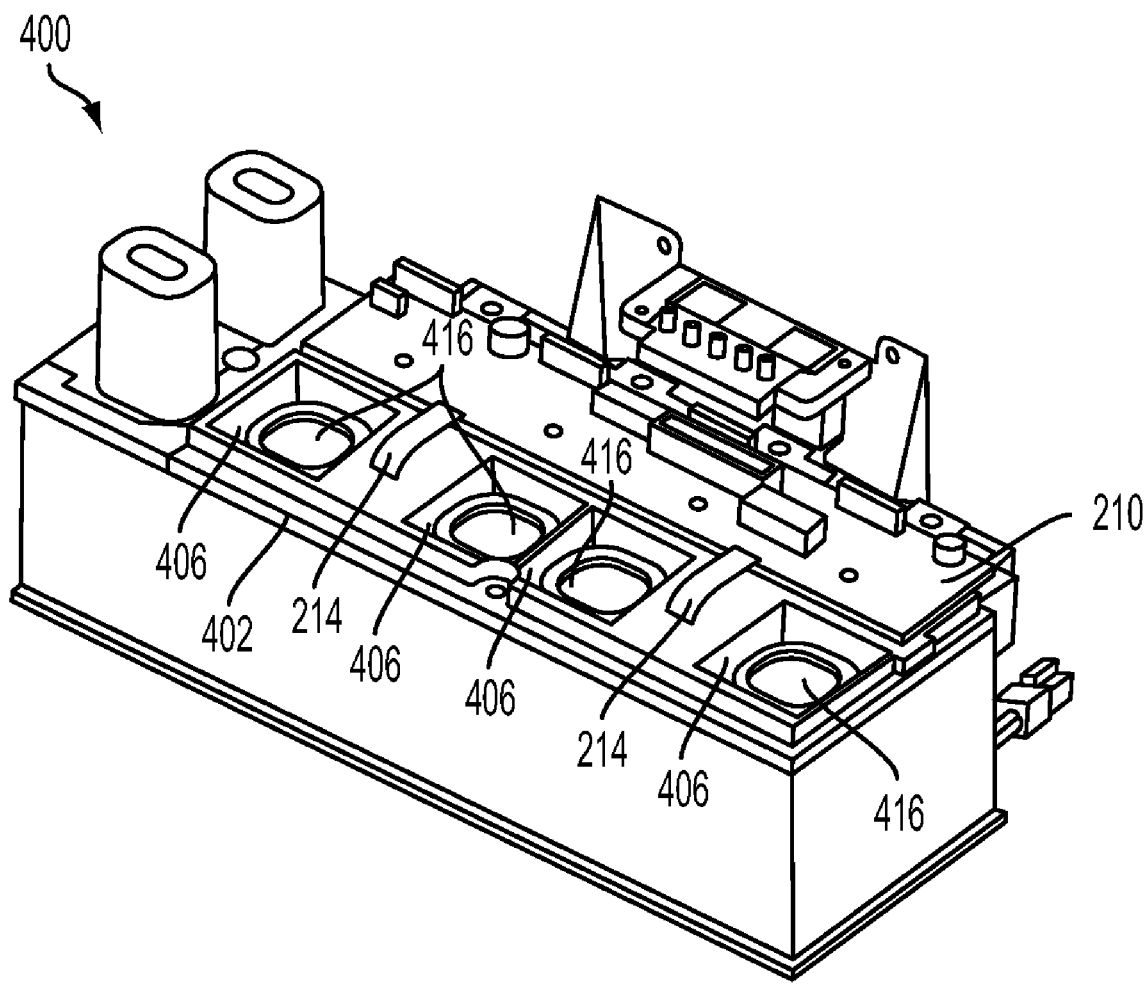
FIG. 4 is a perspective view of an ink storage and supply assembly.
Figure 5:
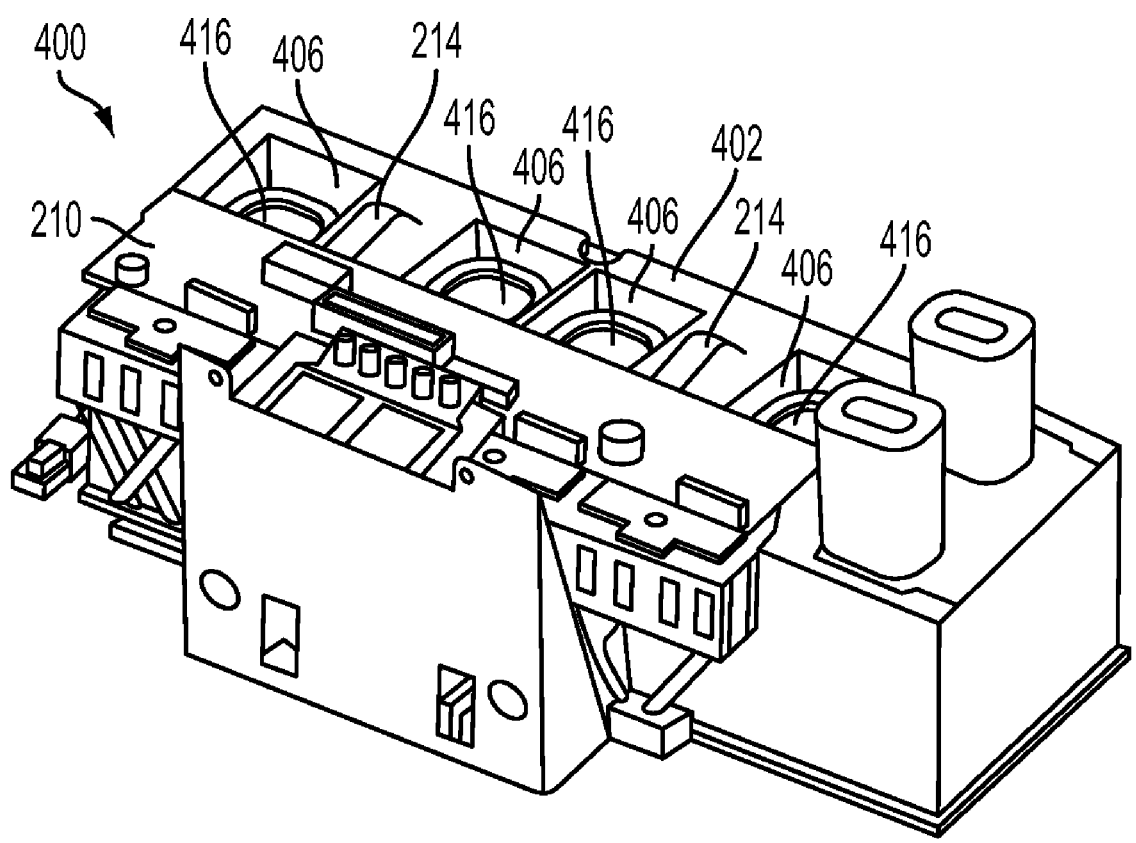
FIG. 5 is another perspective view of the ink storage and supply assembly of FIG. 4.

FIGS. 4 and 5 show front and back perspective views of an embodiment of an ink storage and supply system 400. In the embodiment of FIGS. 4 and 5, the ink storage and supply system 400 includes an ink collector 402 positioned above the primary reservoirs (not shown in FIGS. 4 and 5) of the ink storage and supply system 400. The ink collector 402 includes an opening 406 positioned above each reservoir of the ink storage and supply system 400 that is configured to collect the molten ink as it drips from an ink melter and to direct or funnel the ink into a corresponding reservoir. In some embodiments, the ink collector may also include filters 416 positioned in each opening 406 of the collector that are configured to filter or remove gross contaminants from the ink before the ink enters the reservoirs.

Figure 6:
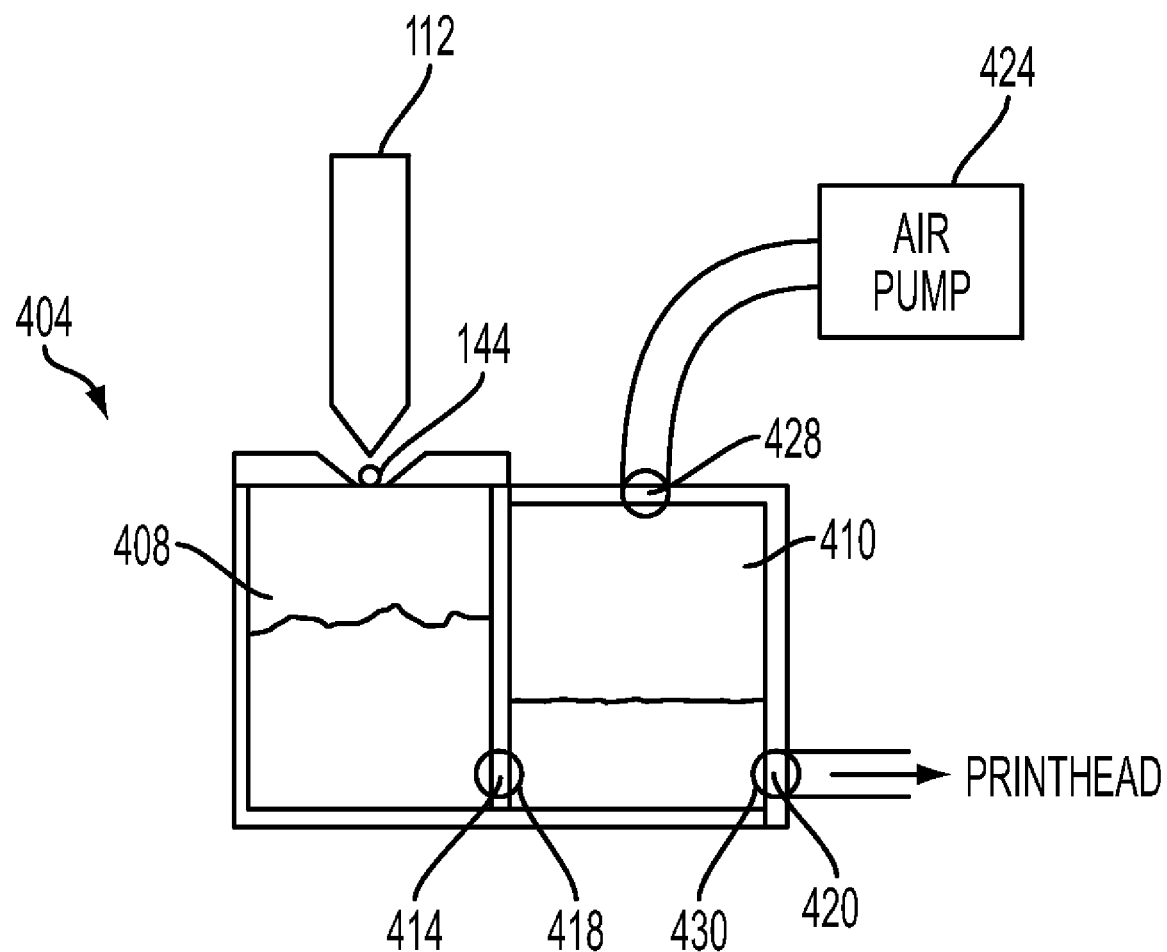
FIG. 6 is a side cross-sectional view of a dual reservoir of the ink melting and control assembly.

In one embodiment, the ink storage and supply system 400 may incorporate a dual reservoir system. FIG. 6 shows a simplified side cross-sectional view of the ink storage and supply system showing an exemplary embodiment of a dual reservoir. In this embodiment, each reservoir 404 of the ink storage and control assembly 400 includes a primary reservoir 408 and a secondary reservoir 410 for each ink source and corresponding ink melter of the ink delivery system. Only one dual reservoir is shown in FIG. 6, but each reservoir 404 of the ink storage and control assembly 400 may be configured as a dual reservoir as depicted in FIG. 6. In the embodiment of FIG. 6, each primary reservoir 408 comprises a low pressure reservoir (LPR) configured to receive molten ink from a corresponding ink melt plate (for example, melt plate 112) of the ink delivery system. Each LPR 408 includes an opening 414 at or near a bottom portion of the LPR 408 through which ink may flow to a corresponding secondary reservoir 410. Gravity, or liquid ink height, may serve as the driving force for causing the molten ink to exit a respective LPR 408 through the opening and into the corresponding secondary reservoir 410. To prevent backflow of ink from a secondary reservoir 410 to the corresponding primary reservoir (LPR) 408, the openings 414 in the LPR's may be provided with one-way check valves 418 that permit ink to flow gravitationally from the LPR 408 into the secondary reservoir 410.

The secondary reservoirs 410 comprise high pressure reservoirs (HPR). Each HPR 410 includes at least one discharge outlet 420 through which molten ink may flow to an ink routing assembly (not shown) for directing ink to one or more printheads (not shown) of the printhead assembly. Each HPR may include a plurality of discharge outlets 420 for supplying ink to a plurality of printheads. For example, in a system that includes four printheads for each color of ink, each HPR may include four discharge outlets, each outlet being configured to supply ink to a different printhead. When charging a printhead with ink, pressure is applied to the ink in a corresponding HPR using, for example, an air pump 424 through a dosing valve 428 or other suitable pressurization means to causing the ink to discharge through the one or more discharge outlets 420 of the HPR. The discharge outlet(s) of the HPR may include check valve(s) 430 or other suitable backflow prevention means that are configured to open to permit the flow of molten ink from the secondary reservoir to the printhead when the HPR is pressurized while preventing backflow of the ink through the opening 420 back into the HPR 410. In addition, the valve 418 in the opening 414 is configured to prevent backflow of ink from the secondary reservoir to the primary reservoir when the secondary reservoir is pressurized.

Figure 7:
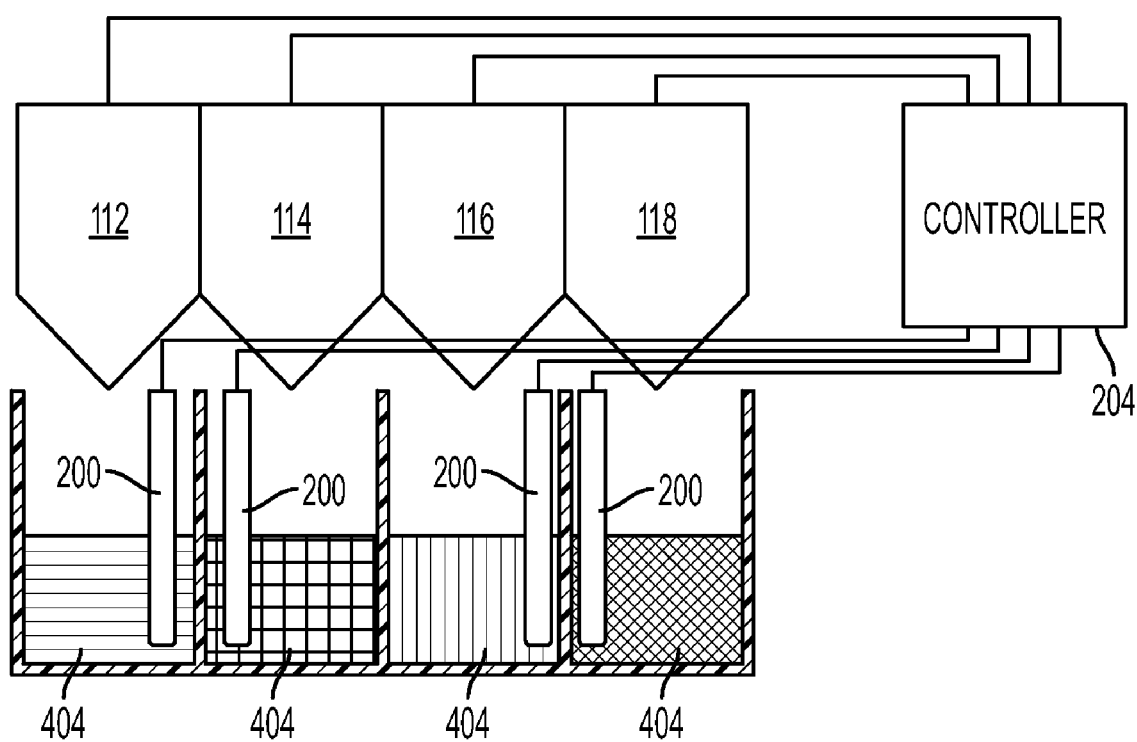
FIG. 7 is a front cross-sectional view of an ink level sensing system.

In order to prevent the ink storage and supply assembly 400 of the imaging device from exhausting the available supply of ink, the reservoirs 404 of the ink storage and supply assembly 400 may be provided with ink level sensors 200. FIG. 7 shows a schematic diagram an exemplary reservoir ink level sensing system for use with the ink storage and supply system 400. As depicted in FIG. 7, the ink level sensing system includes an ink level sensor 200 positioned in each reservoir 404 of the ink storage and supply system 400 and an ink level controller 204. The level sensors 200 are configured to generate one or more signals indicative of the ink level in the corresponding ink reservoir. The ink level controller 204 is configured to receive the signals indicative of the ink levels in each of the reservoirs.

During operation, the ink level controller 204 is configured to maintain a substantially consistent amount of melted ink in the reservoirs available for delivery to the printheads. Accordingly, during operations, the controller 204 is configured to monitor the ink level sensors 200 to determine when the ink level of a reservoir reaches one or more predetermined threshold levels. For example, when a level sensor 200 indicates that the ink level in a reservoir has fallen below a "start fill" level, the controller is configured to signal the corresponding ink melter 112, 114, 116, 118 to begin melting and supplying ink to the ink reservoir. The controller 204 is configured to monitor the ink level sensor in the reservoir as the melted ink is being supplied to the reservoir to determine when a "stop fill" level is reached at which point the controller is configured to signal the appropriate melter to stop supplying ink to the reservoir. Detecting an ink supply deficiency, melting the solid ink in response to the deficiency, and refilling the reservoir to a supply level with the melted ink may be referred to as an "ink melt duty cycle." In addition to the start fill and stop fill levels, the controller is configured to monitor the ink levels as the reservoir is being filled to determine when a "last dose" level is reached at which point the controller may pause printing operations until the reservoir has been replenished. The last dose level corresponds to the level of ink at which continued printing operations run the risk of running the reservoir dry.

The ink level sensors 200 of the present embodiment are configured to measure the level of ink in each of the reservoirs 404 in a substantially continuous manner. As explained in more detail below, the ink level sensors of the present disclosure are configured to sense or detect the height of ink in a reservoir by detecting or measuring a base line conductivity of the ink present in the reservoir with a lower probe 248, shown in FIGS. 12-15, positioned in a lower portion of a reservoir. An upper probe 246, also shown in FIGS. 12-15, extends upward from the lower probe 248 in the reservoir and is configured to detect or measure the conductivity of the ink in the reservoir as the ink height changes and the upper probe 246 becomes covered or uncovered by ink. The ink level in a reservoir is determined by calculating the ratio of the varying conductance of the ink in the reservoir indicated by the upper probe 248 to the base line conductance of the ink in a reservoir indicated by the lower probe 246.

Figure 8:
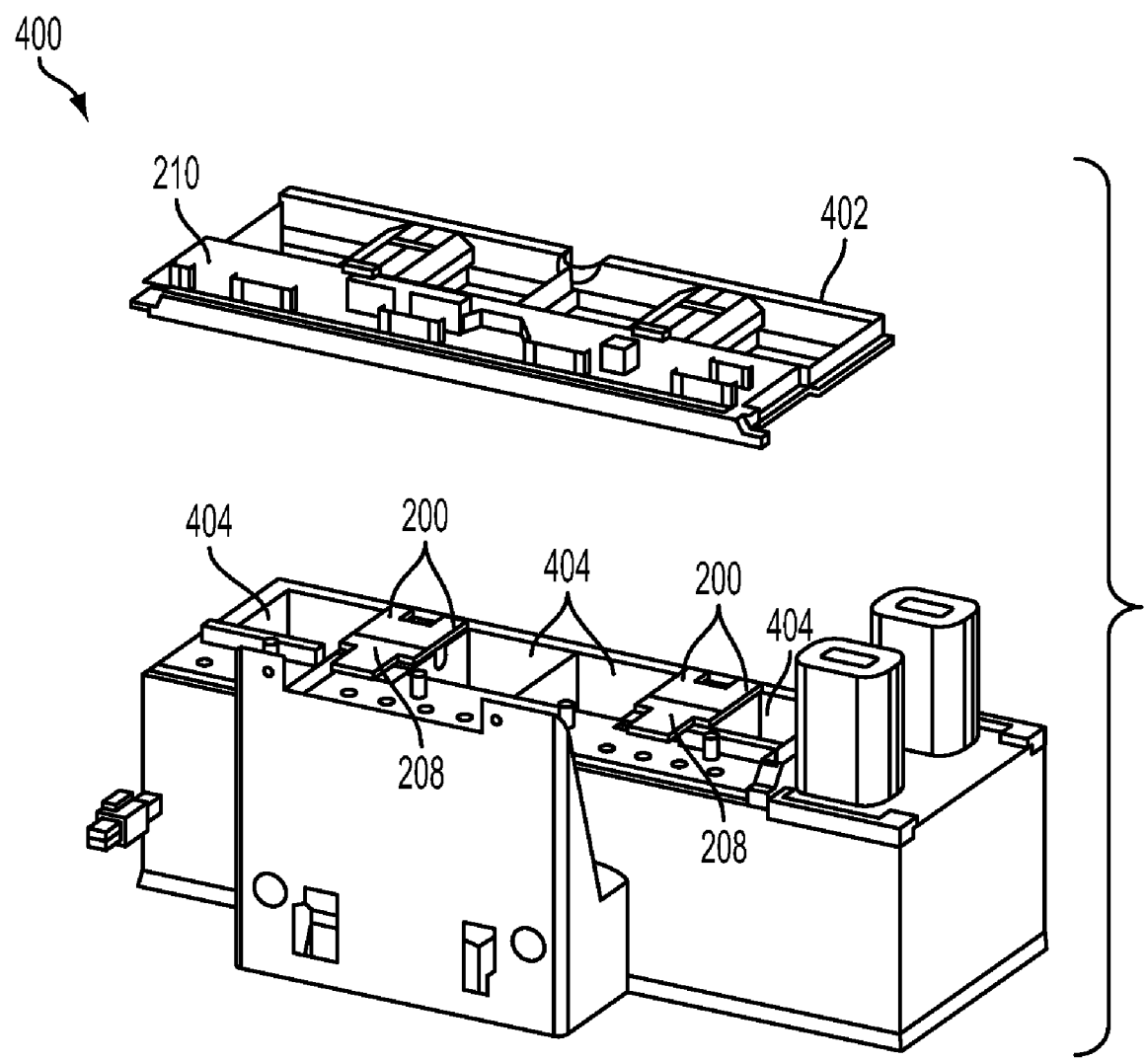
FIG. 8 is a perspective view of the ink storage and supply assembly with the cover removed showing the ink level sensors in the reservoirs.
Figure 9:
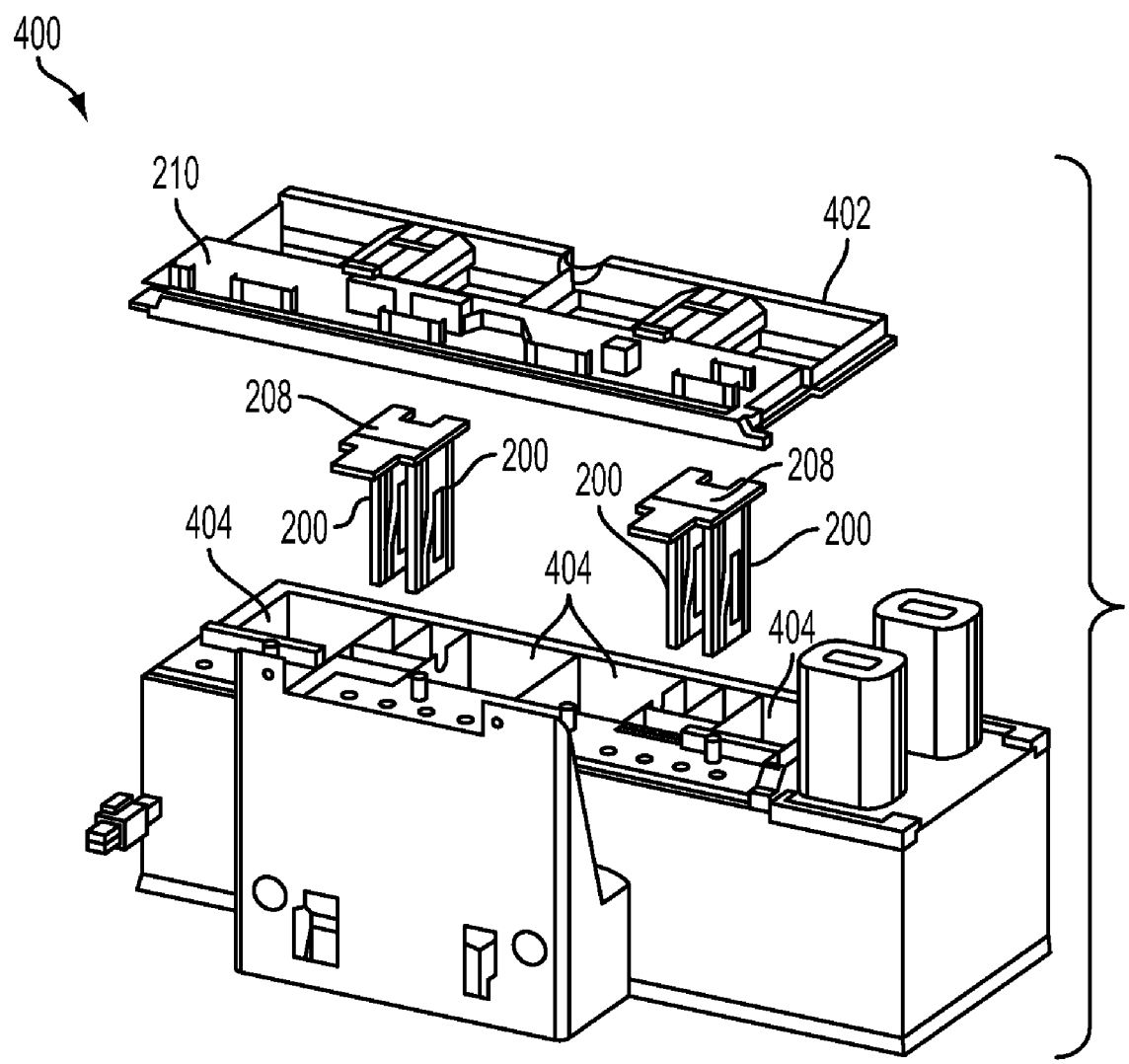
FIG. 9 is a perspective view of the ink storage and supply assembly with the cover removed showing the ink level sensors out of the reservoirs.

FIGS. 8 and 9 show the ink storage and supply system 400 with the ink collector/filter housing removed showing the reservoirs 404 and corresponding ink level sensors 200 of the present disclosure. In particular, FIG. 8 shows the ink level sensors 200 positioned in each of the reservoirs 404 of the ink storage and supply system 400, and FIG. 9 shows the ink level sensors 200 removed from the corresponding reservoirs 404 for clarity. In the dual reservoir system of FIG. 6, ink level sensors 200 may be provided in the primary reservoirs 408 of the ink storage and supply system 400.

Level sensor positioning support members 208 are operably connected to the level sensors 200 and the ink storage and supply system 400 to locate or position the level sensors in their respective reservoirs 404. As depicted in FIGS. 8-11, a single support member 208 may be used to support two level sensors 200 in adjacent reservoirs (for a total of two support members in the exemplary embodiment). A separate support member, however, may be provided for each level sensor. The support members 208 may be formed of any suitable material capable of supporting the level sensors, such as plastic, and may include features that enable the support members to be secured, fixedly or removably, to ink storage and supply system. For example, the support members may include fastener openings 210 that are configured to receive a fastener, such as a screw or bolt, therethrough and into a corresponding fastener opening (not shown) in the ink storage and supply system. The support members also include appropriate features (explained below) that enable the level sensors to be secured, fixedly or removably, to the support members.

Referring now to FIGS. 12-15, there is shown an embodiment of a level sensor 200. The level sensor 200 includes a body that is configured for insertion into an ink reservoir so that a bottom or lower portion of the sensor is at or near a bottom of the reservoir with the top portion of the sensor at or above the top of the reservoir. The level sensor of FIGS. 12-15 includes a lower probe 248, an upper probe 246, and an outer probe 250 that are supported by an insulating probe support frame 254. The insulating probe support 254 is configured to fixedly position the lower probe 248, upper probe 246, and outer probe 250 relative to each other to ensure that the lower probe, upper probe, and outer probe are physically and electrically isolated from each other.

Figure 12:
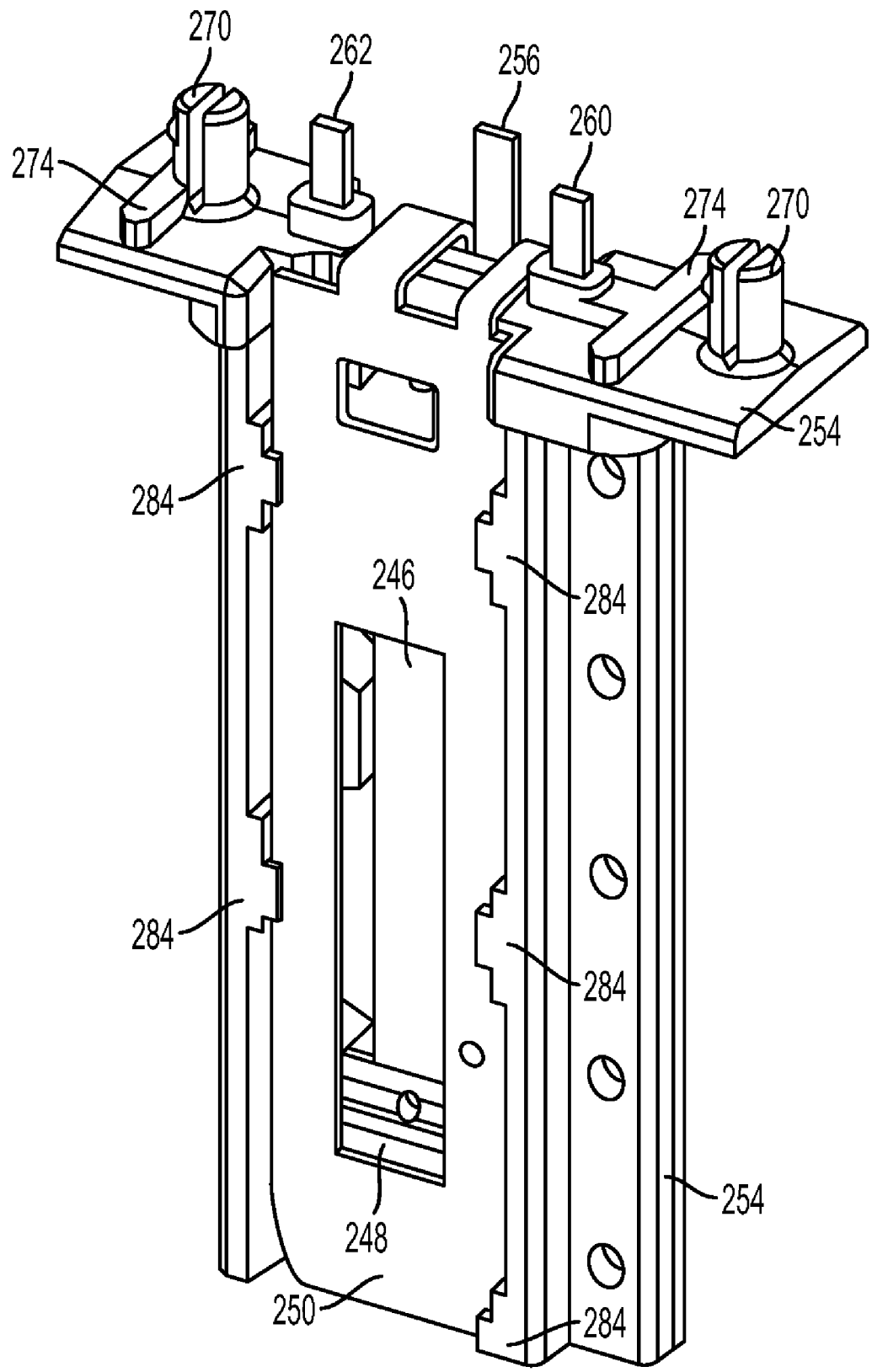
FIG. 12 is a perspective view of a level sensor.
Figure 13:
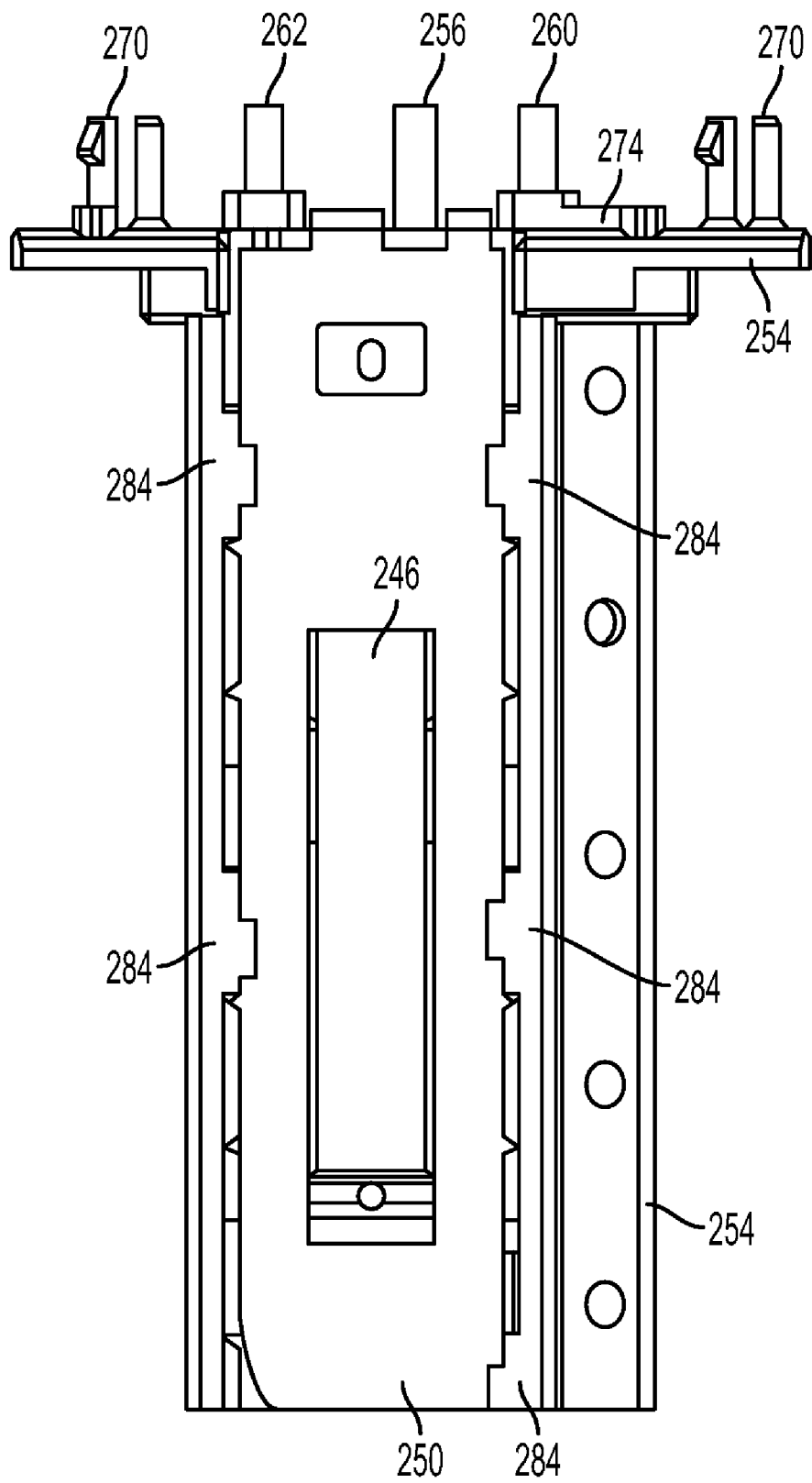
FIG. 13 is a front elevational view of the level sensor of FIG. 12.
Figure 14:
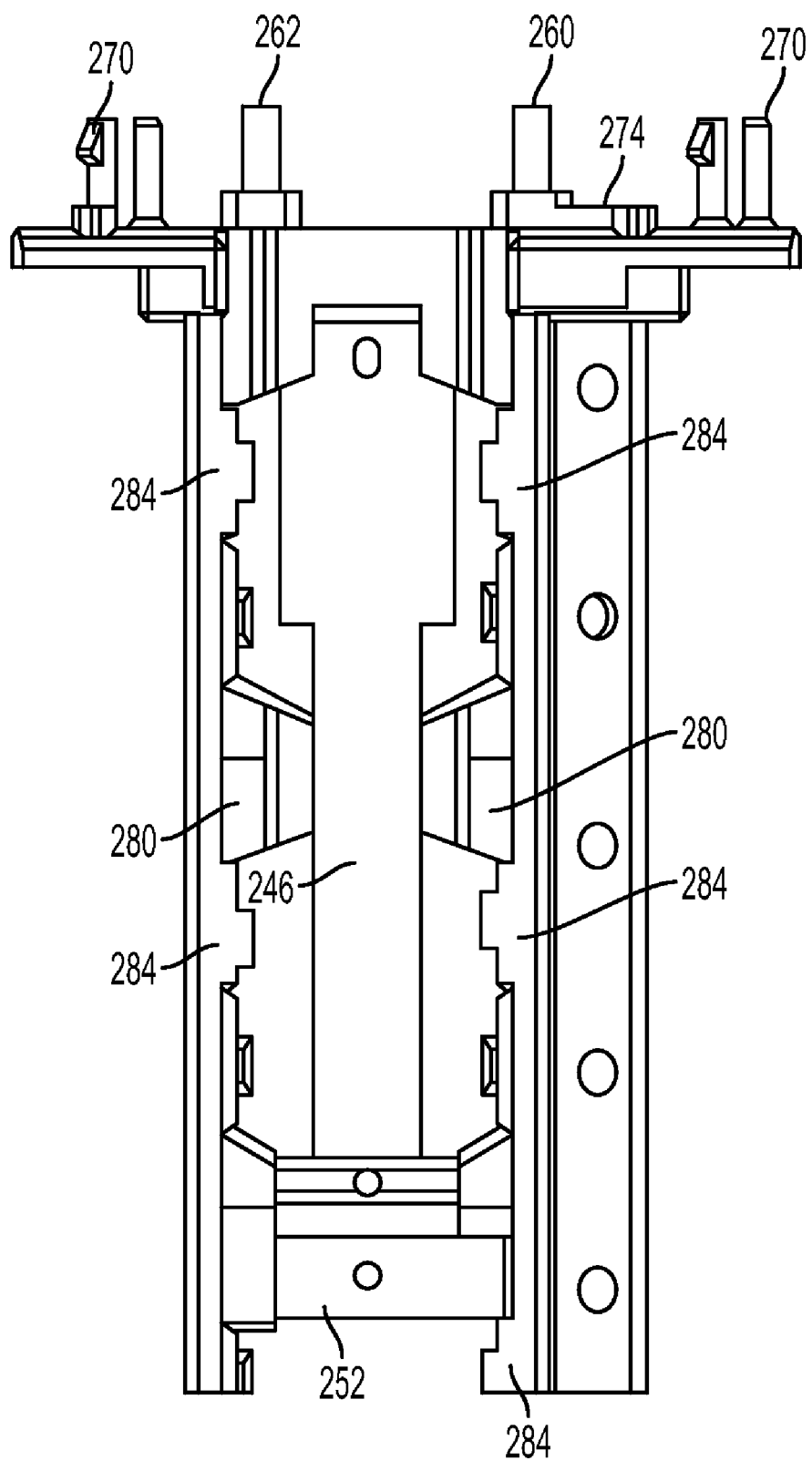
FIG. 14 is a front elevational view of the level sensor of FIG. 12 with the outer probe removed.

The probe support 254 may be formed of any suitable material that is capable of providing the desired electrically isolating properties, such as a plastic material. As shown in FIGS. 12-14, the support frame 254 may include attachment features that facilitate attachment of the level sensors 200 to the sensor supports 208 that connect the sensors to the reservoirs. For example, in the embodiment of FIGS. 12-14, the probe support 254 includes connection studs 270 and stand-offs 274 that enable the level sensors to be fixedly or removably secured to the support member and precisely positioned with respect to the support member so that the tabs 260, 262, 256 of the probes may extend through openings 286 in the support members for connection to a signal transmitting/receiving member (explained below).

The support frame may include suitable features that enable the outer probe to be assembled to the molded frame without using adhesive or additional parts. For example, the probe support frame 254 may include standoffs 280 (best seen in FIG. 14) and opposing tabs 284 that define a slot in the direction of insertion that is configured to receive the outer probe 250 and to position the outer probe 250 with respect to the upper 246 and lower probes 248 to provide a predetermined gap therebetween. The standoffs 280 and opposing tabs 284 may be offset as depicted in FIG. 14 to allow for molding in an injection molding machine.

Figure 15:
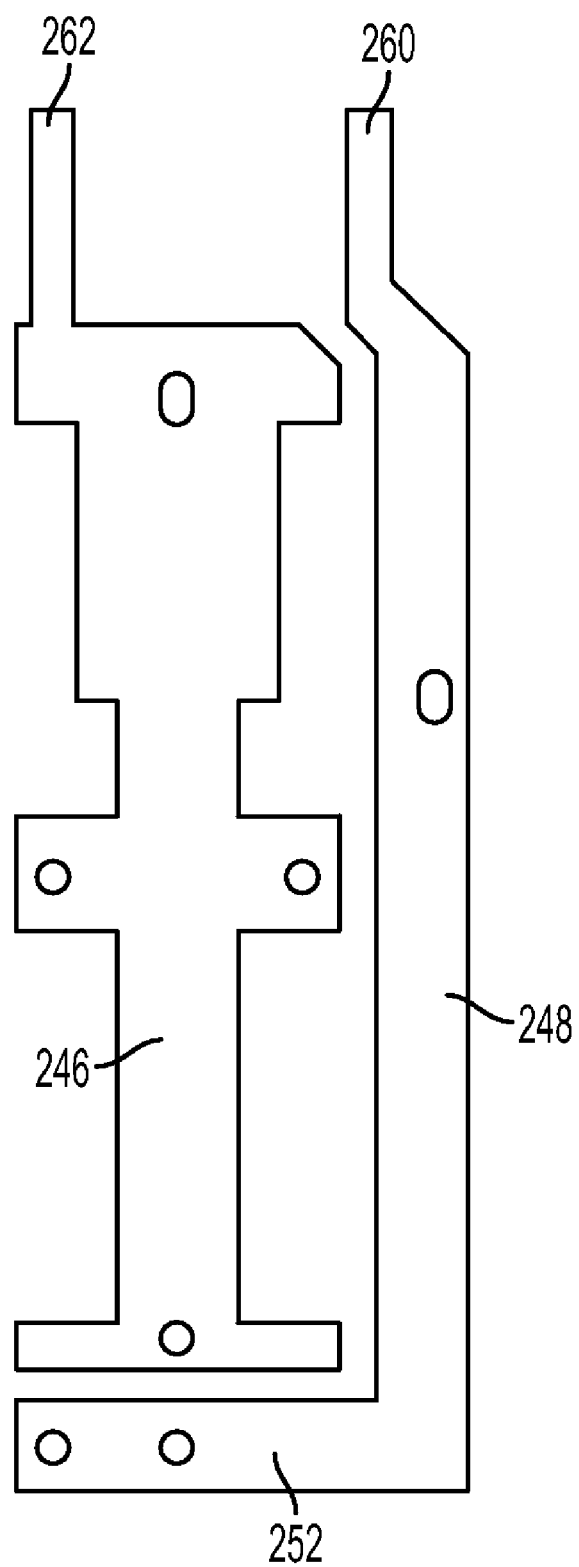
FIG. 15 is a front elevational view of the upper and lower probes of the level sensor of FIG. 12.

FIG. 15 best shows the spatial relationship of the lower probe 248 and upper probe 246 with respect to each other in the support frame (not shown in FIG. 15). As seen in FIG. 15, the lower probe 248 includes a lower portion 252 that is configured to extend to the bottom portion of the level sensor 200 below the upper probe 248 so that the lower portion 252 of the lower probe is positioned at or near the bottom of an ink reservoir when the level sensor is inserted into the reservoir. The upper probe 246 is positioned above the portion 252 of the lower probe 248 and extends to an upper portion of the probe support. As seen in FIGS. 12-14, the outer probe 250 is positioned on the probe support 254 so that it extends substantially from the bottom to the top of the probe support frame 254 alongside both the lower probe 248 and the upper probe 246.

Each of the upper 246, lower 248, and outer probes 250 of each ink level sensor 200 is operably connected to an ink level controller 204 via signal transmitting/receiving members 214. Accordingly, each of the upper 246, lower 248, and outer probes 250 includes a terminal or tab that extends upward from the insulating support assembly for connection to the signal transmitting/receiving member. For example, the outer probe includes tab 256, lower probe includes tab 260, and upper probe includes tab 262 that each extends upward through the top portion of the probe support.

Figure 10:
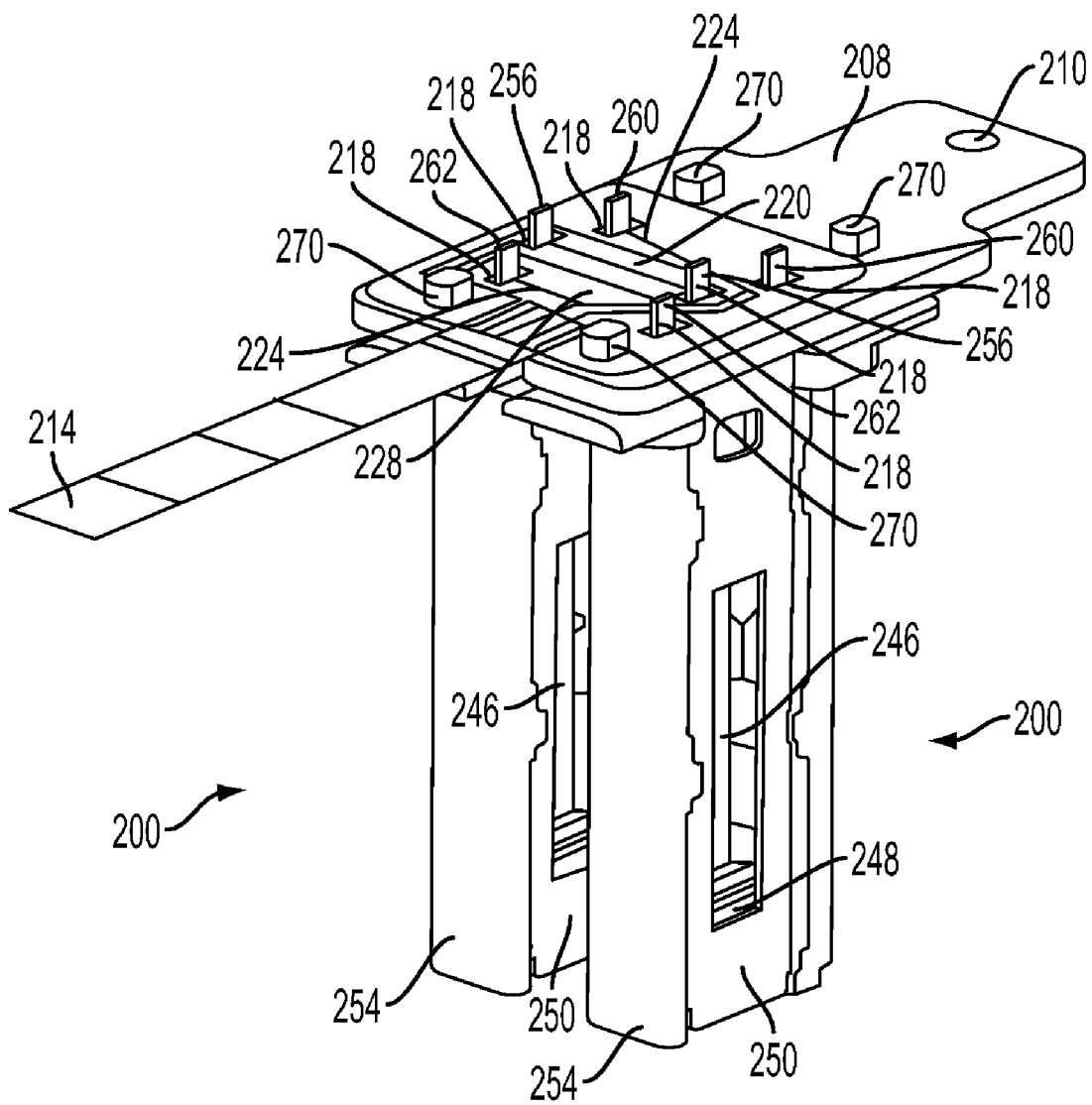
FIG. 10 is a perspective view of a pair of level sensors and the corresponding sensor support and flex tape.
Figure 11:
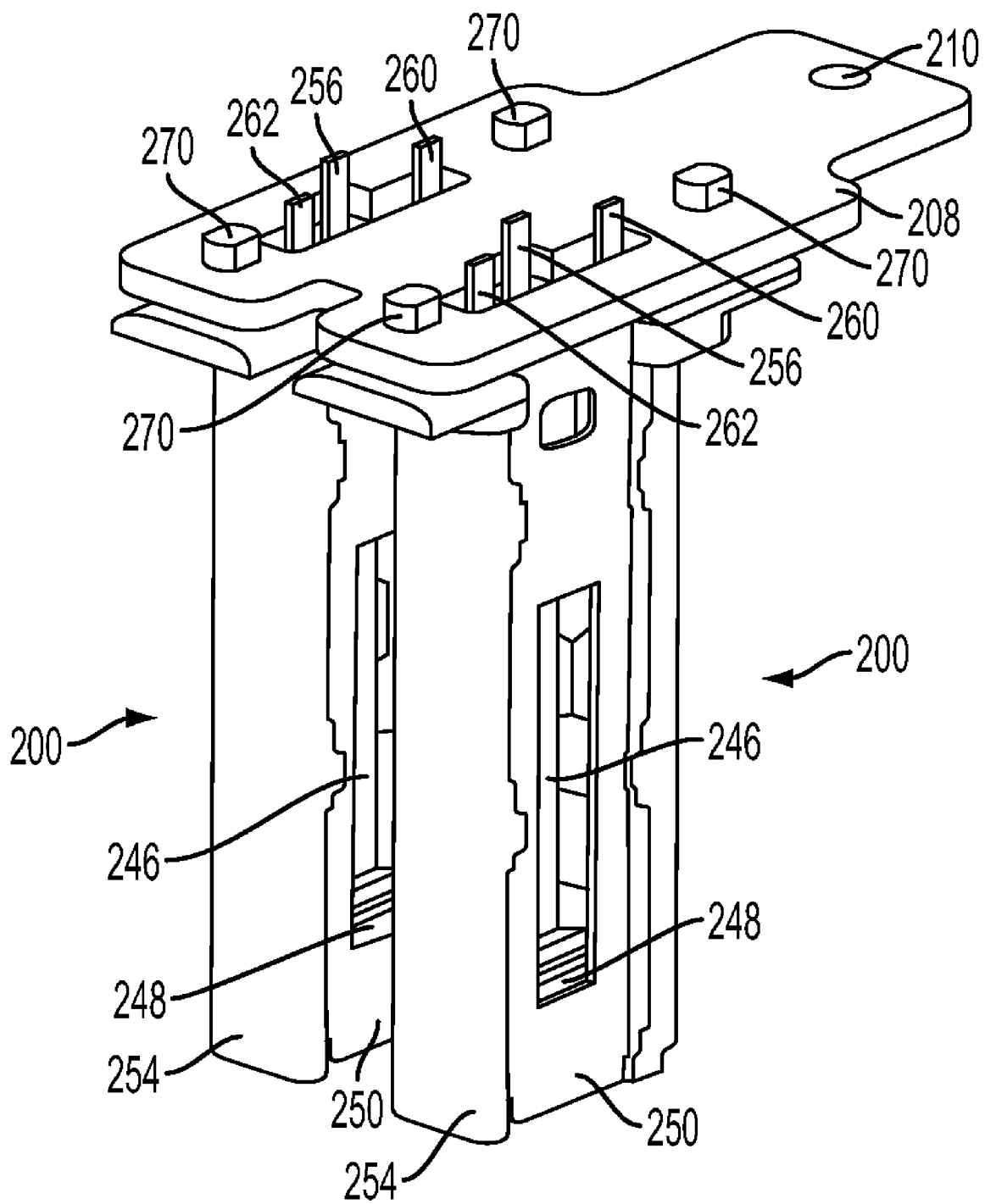
FIG. 11 is a perspective view of the pair of level sensors of FIG. 10 without the flex tape.

The signal transmitting/receiving members may comprise any suitable device that enables signal transmission between the tab of the probes of the level sensors and the ink level controller. In the embodiment of FIGS. 8-10, the signal transmitting/receiving members 214 comprise flexible circuit members, also referred to in the art as flex tapes, flex circuits, flex cables, etc. The flexible circuit members comprise substantially flat single or multilayer flexible substrates that include conductive lines or traces for routing signals between the level controller implemented in circuit board 210 and the tabs of the sensor probes. Flex circuits are "flexible" in the sense that they may undergo elastic deformation, i.e., bending, when subjected to reasonable strain values. The flex circuits or tapes are configured to bend or deform without affecting the electrical interconnections between the probe tabs and the circuit board 210. Flex circuit substrates may be formed of a suitable flexible material such as polyester, polyimide, polyetherimide, or the like. A plurality of conductive probe traces are embedded, over-molded, laminated into, or otherwise formed in one or more layers, referred to herein as circuit layers, of the flexible circuit substrate. The conductive probe traces may be formed of any suitable conductive material such as copper, aluminum, or the like.

In the embodiment of FIGS. 8-11 in which two level sensors 200 are supported in adjacent reservoirs by a single support member 208, a single flex tape 214 may be utilized to route the input and output signals between the two level sensors 200 and the circuit board 210. Each level sensor, however, may be provided with a dedicated signal transmitting/receiving member, or flex tape. As seen in FIG. 10, each flex circuit includes a sensor end 304 configured for operable connection to a level sensor 200 pair and a circuit board end 308 for operable connection to the circuit board 210. A longitudinally extending portion 310 of the flex circuit extends between and routes the probe traces from the circuit board end to the sensor end of the flex circuit. The probe traces include terminations (not shown) at the circuit board end 308 of the flex circuit that may be connected to the circuit board 210 in any suitable manner that permits reliable transmission of signals between the circuit board and the sensor probes. In the embodiment of FIG. 10, the circuit board end and the longitudinally extending portion of the flex tape includes a single circuit layer in which the probe traces are arrayed extending from the circuit board end to the sensor end.

Figure 17:
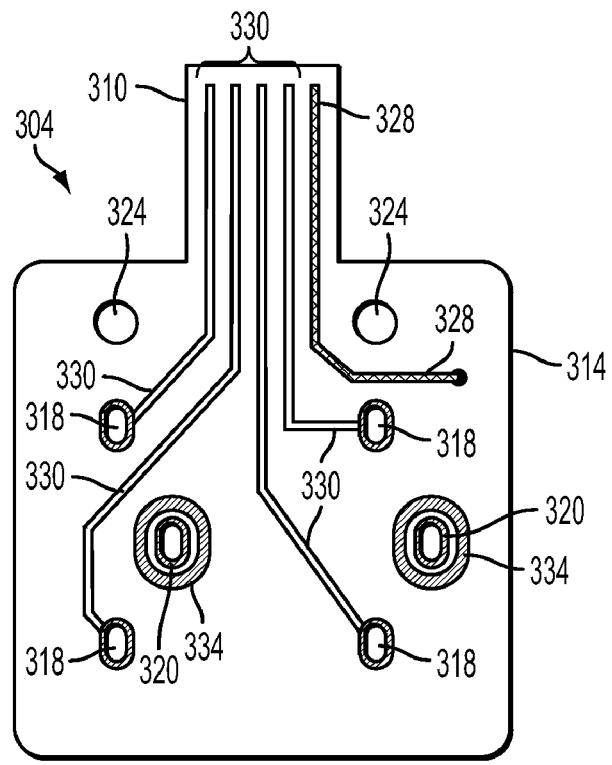
FIG. 17 is a top view of the sensor end of a flex circuit for connecting a level sensor pair to a circuit.
Figure 18:
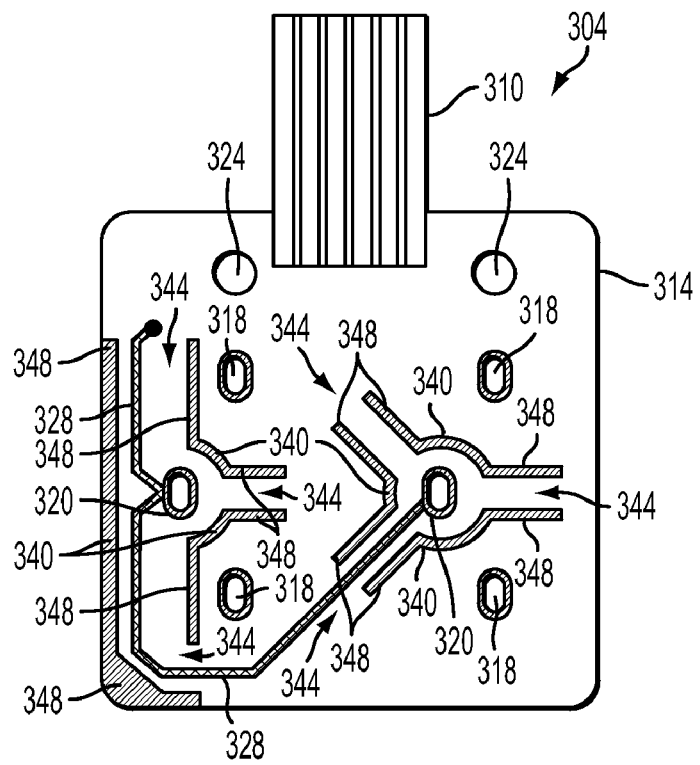
FIG. 18 is a bottom view of the sensor end of the flex circuit for connecting a level sensor pair to a circuit.

FIGS. 17 and 18 depict top surface 314 and bottom surface 318 views, respectively, of the sensor end 304 of an exemplary flex circuit. The bottom surface 318 of the sensor end is configured for placement facing downwardly towards the top of the level sensors and the ink chamber of the ink reservoirs. As seen in FIGS. 17 and 18, the sensor end 304 of the flex circuit includes connection points, or connectors, 318, 320 for electrically connecting the probe traces of the flex tape to the appropriate probe tabs. The connectors may comprise openings or through holes that extend through the sensor end of the flex circuit in positions corresponding to the probe tabs that may be partially or completely plated with a conductive material to which the appropriate probe trace is electrically connected. For example, sensor end of the flex circuit includes connection openings 320 for receiving the tabs of the outer probes of the level sensor pair and connection openings 318 for receiving the tabs of the upper and lower probes of the level sensor pair. The connection openings 318, 320 in the sensor end of the flex circuit may be electrically connected to the appropriate probe tab in any suitable manner such as by soldering. In addition, sensor end 304 may include alignment/attachment openings 324 that are configured to receive connection studs 270 of the level sensors therethrough that enable the flex circuit to be precisely positioned with respect to the support member and level sensors so that the tabs 260, 262, 256 of the probes may extend through the appropriate connection openings in flex circuit.

Each connector 318, 320 in the sensor end 304 of the flex circuit is electrically connected to one of the probe traces that extends continuously from the circuit board end of the flex circuit. In particular, the flex circuits include input signal traces 328 that are configured to route signals from the circuit board to the outer probe connection points 320 and output, or return path, signal traces 330 that are configured to route signals from the upper and lower probe connection points 318 back to the circuit board 210. The input or incoming signal paths, i.e., input signal traces 320, and the outgoing, or return, signal paths 318 are electrically and physically isolated from each other in order to limit crosstalk between signal paths. The input 328 and output signal traces 330 are indicated by lines in FIGS. 17 and 18, however, it is to be understood that the traces are embedded beneath the surface of the flex circuit. As seen in FIG. 17, a separate output signal trace 330 is electrically connected to each connection point 318 in the sensor end 304 corresponding to the upper and lower probes of the level sensor pair (as depicted in FIG. 10). As explained below, the ink level controller 204, via the circuit board 210, is configured to drive an AC signal to the outer probes 250 of the level sensors. Accordingly, a single input probe trace 328 may be tied to both of the outer probe connection points 320 in the sensor end of the flex circuit as depicted in FIG. 18. A separate input probe trace, however, may be provided for each outer probe of the level sensor pair.

The flex circuits 214 may be formed as single or multilayer flexible substrates with the pattern of conductive traces in any suitable manner. In the embodiment of FIGS. 17 and 18, at least the sensor end 304 of the flex circuits is formed as a two-layer flexible substrate. The use of multiple layers in the flex circuits enables different probe traces to be formed in different circuit layers of the substrate. Accordingly, in the embodiment of FIGS. 17 and 18, the use of two circuit layers at least in the sensor end of the flex circuits enables the input signal traces 328 from the circuit board to the outer probes of the level sensors to be at least partially routed in a first layer, e.g., the bottom layer 318, of the sensor end and the return path signal traces 330 from the upper and lower probes to the circuit board to be routed in a second layer, e.g., the top layer 314, of the sensor end. One or the other of the top and bottom circuit layers, e.g., the top layer 314 in FIGS. 17 and 18, of the flex circuits may be formed integrally with the longitudinally extending portion 310 and the circuit board end 308 of the flex circuit. Separating the incoming signal paths and the outgoing or return signal paths into different circuit layers in the flex circuits reduces the chance for crosstalk to between the incoming and outgoing signal paths. Using multiple circuit layers may also reduce the complexity of the flex circuit design because the incoming and/or outgoing signal traces do not have to have specially designed routing configurations in order to maintain the separation between the incoming and outgoing signal paths. For example, the first circuit layer including the incoming signal paths or traces and the second circuit layer including the outgoing signal paths of the sensor end of the flex circuits may each be manufactured separately with separate trace patterns and subsequently superimposed and bonded or attached to each other in any suitable manner as known in the art.

During operation, to detect the level of ink in an ink reservoir, an AC signal is driven, or input to the tab 256 of the outer probe 250 from the signal source 230 through the input signal path 304. The ink 290 conducts the AC signal to the lower probe 248 and to the upper probe 246. Controller 204 shown in FIG. 16 detects a current flow from the outer probe 250 through the ink 290 to the lower probe 248. Controller 204 also detects a current flow from the outer probe 250 through the ink 290 to the upper probe 246. Assuming that the ink temperature and conductivity remains relatively consistent, a substantially constant current flow is detected via the lower probe 248. Varying levels of current flow are detected via the upper probe 246 as more or less of the upper probe's surface area is covered or uncovered in ink. The controller 204 is configured to calculate the ratio of the varying current flow in the upper probe 246 to the constant current flow of the lower probe 248 resulting in a continuous measurement of the height of ink in the ink reservoir.

Figure 16:
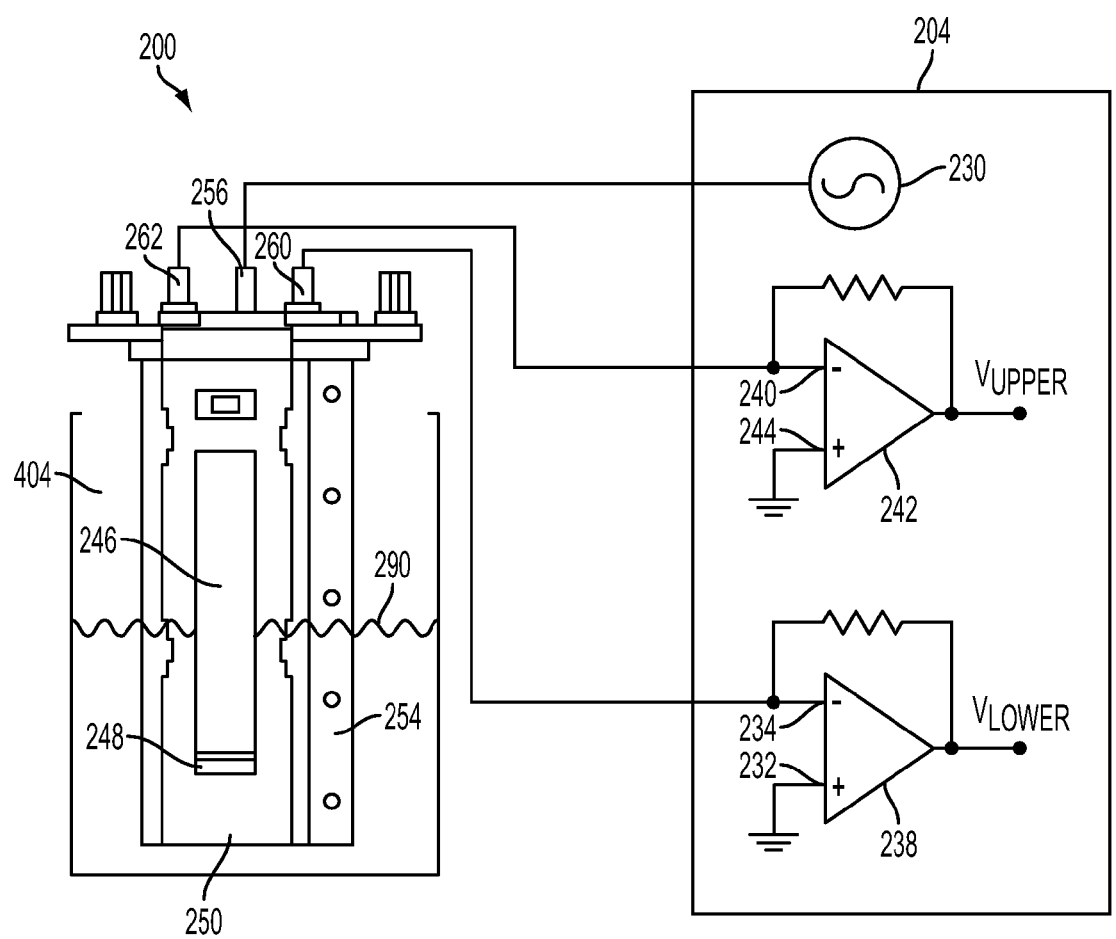
FIG. 16 is a simplified schematic and circuit diagram of an ink level sensor and ink level controller.

As depicted in FIG. 16, the tab 260 of the lower probe 248 is electrically connected to the negative input 234 of op/amp 238 in controller 204 via a first output signal path 308. This negative input 234 forms a virtual ground by connecting the positive input 232 of op/amp 234 to ground and also connecting the negative input 234 of op/amp 238 through a resistor to the output of op/amp 238. This virtual ground circuit eliminates any stray currents that can arise to conductivity from the probes and associated traces and wires to electrical ground (i.e., reservoir body and other metal structures). Responsive to the current flow from the outer probe 250 through the ink 290 to lower probe 248, op/amp 238 outputs a voltage $V_{lower}$ that is an expression of a conductance of the ink 290 in the reservoir 404. The conductance is measured for substantially any level of ink 290 in the reservoir 404 because the lower probe 248 is positioned near the bottom of the reservoir 404.

The tab 262 of the upper probe 246 is electrically connected to the negative input 240 of op/amp 242 in controller 204 via a second output signal path 310. This negative input 240 forms a virtual ground by connecting the positive input 244 of op/amp 242 to ground and also connecting the negative input 240 of op/amp 242 through a resistor to the output of the op/amp 242. This virtual ground circuit eliminates any stray currents that can arise due to conductivity from the probes and associated traces and wires to electrical ground (i.e., reservoir body and other metal structures). Responsive to the current flow from the outer probe 250 through the ink 290 to upper probe 246, op/amp 242 outputs a voltage $V_{upper}$ that is an expression of a conductance of the ink 290 contacting the surface area of the upper probe 246. As the level of the ink 290 varies in reservoir 40, that amount of surface area of upper probe 246 immersed in the ink 290 varies resulting in a varying conductance.

The controller 204 calculates the ratio of the variable $V_{upper}$ to the base value of $V_{lower}$. The ratio calculation can be accomplished by connecting the outputs of the virtually grounding op/amps 242, 238 to analog-to-digital converters (not shown), and dividing the two digital values within controller 204. Any other methods of calculating ratios of voltages commonly known in the art are contemplated to be within the scope of this disclosure. This ratio gives a continuous measurement of the level of ink 290 in reservoir 404. The conductance of ink varies over types of inks and even within the same type of ink at different temperatures. The two probes 246, 248 result in a ratio of two voltages outputted by virtually grounding op/amps. Thus, no matter what type of ink or what temperature the ink, a ratio of conductance is measured which correlates to ink fluid level within the reservoir chamber.

As mentioned, one difficulty faced in the operation of the level sensors described above is ink from the reservoir contacting the root of one or more of the probe tabs or the probe connection points and shorting out the signal path from the input signal connector to an output signal connector, effectively bypassing the probe because the path between the connectors on the flex cable becomes lower in resistance than the path through the probes in the pool of ink in a reservoir. The presence of ink on the flex cable can cause the level sensing system to fail in multiple ways including, for example, false high readings, false low readings, and shorts, any of which may ultimately disable the printer and require a field replacement of the melt reservoir system.

In order to prevent or limit the ability of the ink in the reservoirs from shorting, the flex circuit 214 includes ground traces that are positioned in the sensor end of the flex circuit between the input signal traces and the output signal traces. The ground traces are exposed on both the top and bottom surfaces of the sensor end in order to allow for the various modes of ink mobility on the flex circuits. For example, if ink from a reservoir contacts the flex circuit and wicks along the bottom or top side of the flex circuit, the electrons that may otherwise travel through the ink film on the flex circuit from the A/C signal input to the return path are shunted to ground, thus preventing them shorting out the incoming to outgoing signal path. Ground traces may be formed of any suitable conductive material such as the material used to form the probe traces described above. The ground traces in the sensor end of the flex circuit may be tied to a ground trace that extends through the flex circuit and is tied to ground in the circuit board. Alternatively, the flex circuit may be formed with a ground plane as is known in the art.

Referring again to FIGS. 17 and 18, the ground traces are positioned in the sensor end to form a continuous guard ring 334 in the top layer and a segmented guard ring in the bottom layer. As used herein, a guard ring refers to a pattern of one or more signal traces tied to ground that form a whole or partial ring or perimeter about one of the connection points, or connectors, in the sensor end of a flex circuit. As seen in FIG. 17, the first guard ring layer of each guard ring is spaced from the corresponding incoming signal connection point and forms a substantially continuous perimeter or ring about the corresponding incoming signal connection point that effectively isolates the incoming signal connector from the outgoing signal connectors in the sensor end.

Referring to FIG. 18, each segmented guard ring includes a plurality of guard ring segments 340 that are positioned in the bottom layer 318 of the sensor end to form a partial perimeter about the corresponding incoming signal connection points 320. Each segment 340 of the segmented guard ring is electrically connected to the continuous guard ring structure of the top layer and spaced from the other segments 340 of the second guard ring layer to form a "break," space, or discontinuity 344 between each guard ring segment 340. The ends of each guard ring segment may include extensions 348 that extend in a direction away from the incoming connection point. The segment extensions 348 may have any suitable configuration and may be straight or curved or a combination of both, and extend for any suitable direction from the associated connection point. The segment extensions expand the ground paths in order to minimize the areas or paths on which electrical current can flow between the guarded incoming signal connection point and the outgoing connection points without being shunted to the grounded segmented guard "ring" instead.

As mentioned, the continuous guard rings 334 in the top layer form substantially continuous ground paths that surround each incoming signal connector 320. The breaks or spaces 344 between the segments 340 of the segmented guard rings in the bottom layer of the sensor end provide paths in the bottom layer that permit the routing of the incoming probe traces 328 to the incoming signal connection points 320 as shown in FIG. 18. Accordingly, in order to tie the incoming signal connectors 320 to the incoming signal trace, the incoming signal trace is routed from the top layer to the bottom layer of the sensor end at point as seen in FIGS. 17 and 18 and then routed between the spaces or breaks between segments 340 in the segmented guard rings of the bottom layer to the appropriate incoming signal connector 320.

Those skilled in the art will recognize that numerous modifications can be made to the specific implementations of the ink conductivity recovery methods described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A circuit for conveying signals, the circuit comprising:
   a substrate having a circuit end, a sensor end, and an elongated body extending therebetween, the substrate being configured to extend between a first ink level sensor positioned in a first ink reservoir and a circuit displaced from the first ink reservoir;
   a first, a second, and a third conductive signal trace positioned in the substrate extending between the circuit end and the sensor end, the circuit end being configured to electrically connect the first, the second, and the third signal traces to the circuit;
   the sensor end including a top layer and a bottom layer, the first signal trace being routed at least partially in the bottom layer and the second and the third signal traces being routed at least partially in the top layer;
   the sensor end including a first, a second, and a third connector each extending through the top and the bottom layers, the first connector being electrically connected to the first signal trace in the bottom layer, the second connector and the third connector being electrically connected to the second signal trace and the third signal trace, respectively, in the top layer, the first connector, the second connector, and the third connector being configured for electrical connection to a first probe, a second probe, and a third probe, respectively, of the level sensor; and
   a first ground trace in the sensor end, the first ground trace including a first continuous guard ring in the top layer of the sensor end completely surrounding and spaced from the first connector in the top layer, and a first segmented guard ring in the bottom layer, the first segmented guard ring including a plurality of segments, each segment in the plurality being electrically connected to the first continuous guard ring in the top layer and being spaced from the other segments in the first segmented guard ring, the first signal trace being routed in the bottom layer to the first connector via a space between the segments of the first segmented guard ring.

2. The circuit of claim 1, at least one of the segments of the first segmented guard ring including an elongated trace extension that extends from at least one end of the at least one segment in a direction away from the first connector.

3. The circuit of claim 2, the first signal trace comprising an incoming signal trace for routing a signal from the circuit to the first probe of the first level sensor, the second and the third signal traces comprising outgoing signal traces for routing signals from the second probe and the third probe, respectively, of the first level sensor to the circuit.

4. The circuit of claim 3, the substrate being formed of a flexible polyimide material.

5. The circuit of claim 4, the first connector, the second connector, and the third connector each comprising an opening configured to receive a probe tab of the first, the second, and the third probes, respectively, of the first level sensor.

6. The circuit of claim 5, further comprising:
   a fourth, a fifth, and a sixth conductive signal trace positioned in the substrate extending between the circuit end and the sensor end, the circuit end being configured to electrically connect the fourth, the firth, and the sixth signal traces to the circuit, the fourth signal trace being routed in the bottom layer of the sensor end and the fifth and the sixth signal traces being routed in the top layer of the sensor end;
   the sensor end including a fourth, a fifth, and a sixth connector each extending through the top and the bottom layers, the fourth connector being electrically connected to the fourth signal trace in the bottom layer, the fifth connector and the sixth connector being electrically connected to the second signal trace and the third signal trace, respectively, in the top layer, the fourth connector, the fifth connector, and the sixth connector being configured for electrical connection to a first probe, a second probe, and a third probe, respectively, of a second level sensor positioned in a second ink reservoir adjacent the first ink reservoir; and a second ground trace in the sensor end, the second ground trace including a second continuous guard ring in the top layer of the sensor end completely surrounding and spaced from the fourth connector in the top layer, and a second segmented guard ring in the bottom layer, the second segmented guard ring including a plurality of segments, each segment of the second segmented guard ring being electrically connected to the second continuous guard ring and being spaced from the other segments of the second segmented guard ring, the fourth signal trace being routed in the bottom layer to the fourth connector via a space between segments of the second segmented guard ring.

7. The circuit of claim 6, at least one of the segments of the second segmented guard ring including an elongated trace extension that extends from at least one end of the at least one segment in a direction away from the fourth connector.

8. The circuit of claim 7, the fourth signal trace comprising an incoming signal trace for routing a signal from the circuit to the first probe of the second level sensor, the second and the third signal traces comprising outgoing signal traces for routing signals from the second probe and the third probe, respectively, of the second level sensor to the circuit.

9. An ink level sensing system comprising:
a first ink level sensor including a first probe, a second probe and a third probe configured for insertion into a first ink reservoir;
a circuit configured to generate a signal to be conveyed to the first probe of the first level sensor and to receive signals from the second probe and the third probe of the first level sensor;
a substrate having a circuit end, a sensor end, and an elongated body extending therebetween, the substrate being configured to extend between the first ink level sensor and the circuit;
a first, a second, and a third conductive signal trace positioned in the substrate extending between the circuit end and the sensor end, the circuit end being configured to electrically connect the first, the second, and the third signal traces to the circuit;
the sensor end including a top layer and a bottom layer, the sensor end being configured for positioning adjacent the first level sensor with the bottom layer facing towards the ink reservoir, the first signal trace being routed in the bottom layer and the second and the third signal traces being routed in the top layer;
the sensor end including a first, a second, and a third connector each extending through the top and the bottom layers, the first connector being electrically connected to the first signal trace in the bottom layer, the second connector and the third connector being electrically connected to the second signal trace and the third signal trace, respectively, in the top layer, the first connector, the second connector, and the third connector being configured for electrical connection to the first probe, the second probe, and the third probe, respectively, of the first level sensor; and
a first ground trace in the sensor end, the first ground trace including a first continuous guard ring in the top layer of the sensor end completely surrounding and spaced from the first connector in the top layer, and a first segmented guard ring in the bottom layer, the first segmented guard ring including a plurality of segments, each segment in the plurality being electrically connected to the first continuous guard ring in the top layer and being spaced from the other segments in the first segmented guard ring, the first signal trace being routed in the bottom layer to the first connector via a space between the segments of the first segmented guard ring.

10. The system of claim 9, at least one of the segments of the first segmented guard ring including an elongated trace extension that extends from at least one end of the at least one segment in a direction away from the first connector.

11. The system of claim 10, the first signal trace comprising an incoming signal trace for routing the signal from the circuit to the first probe of the first level sensor, the second and the third signal traces comprising outgoing signal traces for routing signals from the second probe and the third probe, respectively, of the first level sensor to the circuit.

12. The system of claim 11, the substrate being formed of a flexible polyimide material.

13. The system of claim 12, the first connector, the second connector, and the third connector each comprising an opening configured to receive a probe tab of the first, the second, and the third probes, respectively, of the first level sensor.

14. The system of claim 13, further comprising:
a second level sensor including a first probe, a second probe and a third probe configured for insertion into a second ink reservoir, the circuit being configured to generate a signal to be conveyed to the first probe of the second level sensor and to receive signals from the second probe and the third probe of the second level sensor;
a fourth, a fifth, and a sixth conductive signal trace positioned in the substrate extending between the circuit end and the sensor end, the circuit end being configured to electrically connect the fourth, the firth, and the sixth signal traces to the circuit, the fourth signal trace being routed in the bottom layer of the sensor end and the fifth and the sixth signal traces being routed in the top layer of the sensor end;
the sensor end including a fourth, a fifth, and a sixth connector each extending through the top and the bottom layers, the fourth connector being electrically connected to the fourth signal trace in the bottom layer, the fifth connector and the sixth connector being electrically connected to the second signal trace and the third signal trace, respectively, in the top layer, the fourth connector, the fifth connector, and the sixth connector being configured for electrical connection to the first probe, the second probe, and the third probe, respectively, of the second level sensor; and
a second ground trace in the sensor end, the second ground trace including a second continuous guard ring in the top layer of the sensor end completely surrounding and spaced from the fourth connector in the top layer, and a second segmented guard ring in the bottom layer, the second segmented guard ring including a plurality of segments, each segment of the second segmented guard ring being electrically connected to the second continuous guard ring and being spaced from the other segments of the second segmented guard ring, the fourth signal trace being routed in the bottom layer to the fourth connector via a space between segments of the second segmented guard ring.

15. The system of claim 14, at least one of the segments of the second segmented guard ring including an elongated trace extension that extends from at least one end of the at least one segment in a direction away from the fourth connector.

16. The system of claim 15, the fourth signal trace comprising an incoming signal trace for routing a signal from the circuit to the first probe of the second level sensor, the fifth and the sixth signal traces comprising outgoing signal traces for routing signals from the second probe and the third probe, respectively, of the second level sensor to the circuit.

17. An ink reservoir system comprising:
a first ink reservoir configured to hold a quantity of ink and to communicate ink to at least one printhead;
a first ink level sensor including a first probe, a second probe and a third probe configured for insertion into the first ink reservoir;
a circuit configured to generate a signal to be conveyed to the first probe of the first level sensor and to receive signals from the second probe and the third probe of the first level sensor;
a substrate having a circuit end, a sensor end, and an elongated body extending therebetween, the substrate being configured to extend between the first ink level sensor and the circuit;
a first, a second, and a third conductive signal trace positioned in the substrate extending between the circuit end and the sensor end, the circuit end being configured to electrically connect the first, the second, and the third signal traces to the circuit;
the sensor end including a top layer and a bottom layer, the sensor end being configured for positioning adjacent the first level sensor with the bottom layer facing towards the ink reservoir, the first signal trace being routed in the bottom layer and the second and the third signal traces being routed in the top layer;
the sensor end including a first, a second, and a third connector each extending through the top and the bottom layers, the first connector being electrically connected to the first signal trace in the bottom layer, the second connector and the third connector being electrically connected to the second signal trace and the third signal trace, respectively, in the top layer, the first connector, the second connector, and the third connector being configured for electrical connection to the first probe, the second probe, and the third probe, respectively, of the first level sensor; and
a first ground trace in the sensor end, the first ground trace including a first continuous guard ring in the top layer of the sensor end completely surrounding and spaced from the first connector in the top layer, and a first segmented guard ring in the bottom layer, the first segmented guard ring including a plurality of segments, each segment in the plurality being electrically connected to the first continuous guard ring in the top layer and being spaced from the other segments in the first segmented guard ring, the first signal trace being routed in the bottom layer to the first connector via a space between the segments of the first segmented guard ring.

18. The system of claim 17, further comprising:
a second ink reservoir configured to hold a second ink and to communicate the second ink to at least one printhead;
a second level sensor including a first probe, a second probe and a third probe configured for insertion into the second ink reservoir, the circuit being configured to generate a signal to be conveyed to the first probe of the second level sensor and to receive signals from the second probe and the third probe of the second level sensor;
a fourth, a fifth, and a sixth conductive signal trace positioned in the substrate extending between the circuit end and the sensor end, the circuit end being configured to electrically connect the fourth, the firth, and the sixth signal traces to the circuit, the fourth signal trace being routed in the bottom layer of the sensor end and the fifth and the sixth signal traces being routed in the top layer of the sensor end;
the sensor end including a fourth, a fifth, and a sixth connector each extending through the top and the bottom layers, the fourth connector being electrically connected to the fourth signal trace in the bottom layer, the fifth connector and the sixth connector being electrically connected to the second signal trace and the third signal trace, respectively, in the top layer, the fourth connector, the fifth connector, and the sixth connector being configured for electrical connection to the first probe, the second probe, and the third probe, respectively, of the second level sensor; and
a second ground trace in the sensor end, the second ground trace including a second continuous guard ring in the top layer of the sensor end completely surrounding and spaced from the fourth connector in the top layer, and a second segmented guard ring in the bottom layer, the second segmented guard ring including a plurality of segments, each segment of the second segmented guard ring being electrically connected to the second continuous guard ring and being spaced from the other segments of the second segmented guard ring, the fourth signal trace being routed in the bottom layer to the fourth connector via a space between segments of the second segmented guard ring.

19. The system of claim 18, the first and the fourth signal traces each comprising an incoming signal trace for routing the signal from the circuit to the first probe of the first level sensor and the first probe of the second level sensor, the second and the third signal traces comprising outgoing signal traces for routing signals from the second probe and the third probe, respectively, of the first level sensor to the circuit, the fifth and the sixth signal traces comprising outgoing signal traces for routing signals from the second probe and the third probe, respectively, of the second level sensor to the circuit.

20. The system of claim 19, the substrate being formed of a flexible polyimide material.

* * * * *